United States Patent
Tawata

(10) Patent No.: US 12,157,237 B2
(45) Date of Patent: Dec. 3, 2024

(54) PAINTING ROBOT SYSTEM AND PAINTING METHOD

(71) Applicant: ABB SCHWEIZ AG, Baden (CH)

(72) Inventor: Takahiro Tawata, Shizuoka (JP)

(73) Assignee: ABB SCHWEIZ AG, Baden (CH)

( * ) Notice: Subject to any disclaimer, the term of this patent is extended or adjusted under 35 U.S.C. 154(b) by 438 days.

(21) Appl. No.: 17/582,849

(22) Filed: Jan. 24, 2022

(65) Prior Publication Data
US 2022/0305662 A1  Sep. 29, 2022

(30) Foreign Application Priority Data

Mar. 25, 2021 (JP) ................................. 2021-051273

(51) Int. Cl.
*B05B 13/04* (2006.01)
*B05D 1/02* (2006.01)
(Continued)

(52) U.S. Cl.
CPC ......... *B25J 9/1697* (2013.01); *B05B 13/0431* (2013.01); *B05B 13/0452* (2013.01);
(Continued)

(58) Field of Classification Search
None
See application file for complete search history.

(56) References Cited

U.S. PATENT DOCUMENTS 9,452,616 B1 * 9/2016 Mathis .................. B41J 3/4073
11,203,030 B2 * 12/2021 Fritz .................. B05B 13/0431
(Continued)

FOREIGN PATENT DOCUMENTS

JP      2001058422 A       3/2001
JP      2001334661 A       12/2001
(Continued)

OTHER PUBLICATIONS

Notice of Reasons for Refusal, issued by the Japanese Patent Office, regarding corresponding patent application Serial No. JP 2021-051273; dated Jun. 16, 2021; 4 pages (with Translation).
(Continued)

*Primary Examiner* — Binu Thomas
(74) *Attorney, Agent, or Firm* — Greenberg Traurig, LLP

(57) ABSTRACT

Provided are a painting robot system that may perform painting well not only on a forward path but also on a backward path, and a painting method. An image processing portion (210) included in a painting robot system (11) creates image data for a forward path in a state of having first strip image data of a strip shape corresponding to nozzles (54A) in a first nozzle column (55A) and second strip image data of a strip shape corresponding to nozzles (54B) in a second nozzle column (55B), the image processing portion (210) creates the second strip image data as image data for a backward path in a state of deviating relative to the first strip image data, and the amount of position deviation is set as the following position: the Pth nozzle (54B) in the second nozzle column (54B) lands first relative to the Pth nozzle (54A) in the first nozzle column (54A) with an adjacent landing position at a distance of multiplying the number (N) by twice of the distance (L1).

8 Claims, 17 Drawing Sheets

(51) Int. Cl.
  *B25J 9/16* (2006.01)
  *B25J 11/00* (2006.01)
  *B41J 3/407* (2006.01)
  *B41J 25/00* (2006.01)

(52) U.S. Cl.
  CPC .............. *B05D 1/02* (2013.01); *B25J 9/1653* (2013.01); *B25J 9/1664* (2013.01); *B25J 9/1679* (2013.01); *B25J 11/0075* (2013.01); *B41J 25/003* (2013.01); *B41J 3/4073* (2013.01)

(56) References Cited

U.S. PATENT DOCUMENTS

| | | | | |
|---|---|---|---|---|
| 2001/0017085 A1* | 8/2001 | Kubo | ................... | B41J 3/4073 101/35 |
| 2014/0242285 A1* | 8/2014 | Pettersson | ............ | G01B 11/002 118/697 |
| 2017/0252765 A1* | 9/2017 | Medard | .................. | B41J 3/4073 |
| 2019/0337311 A1* | 11/2019 | Fritz | ...................... | B41J 3/4073 |
| 2020/0108598 A1* | 4/2020 | Flannigan | ........... | B05B 13/0431 |
| 2020/0406617 A1* | 12/2020 | Tawata | ................ | B05B 13/0431 |
| 2021/0394217 A1* | 12/2021 | Chevron | ............. | B05B 13/0431 |
| 2022/0134574 A1* | 5/2022 | Provenaz | ............ | B05B 13/0431 427/427.2 |
| 2022/0274398 A1* | 9/2022 | Tawata | ................ | B05B 13/0431 |

FOREIGN PATENT DOCUMENTS

| | | |
|---|---|---|
| JP | 2003182079 A | 7/2003 |
| JP | 2015520011 A | 7/2015 |
| JP | 5976320 B2 | 8/2016 |

OTHER PUBLICATIONS

Extended European Search Report, issued by the European Patent Office, regarding corresponding patent application Serial No. EP 22152984.5; dated Jul. 1, 2022; 7 pages.

* cited by examiner

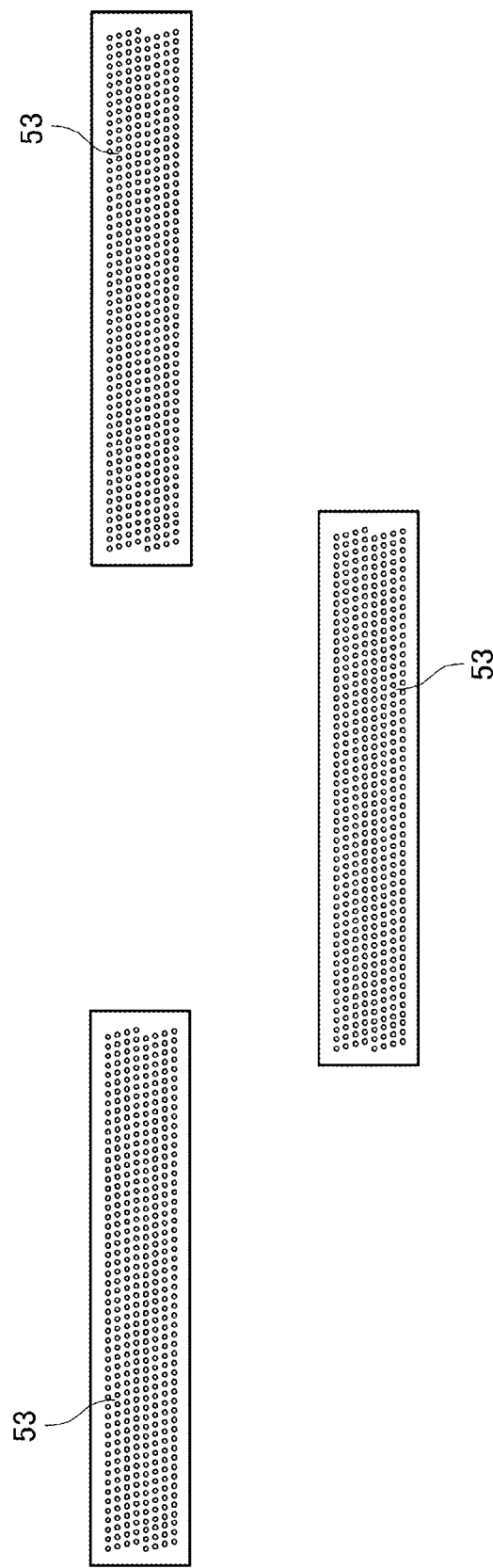

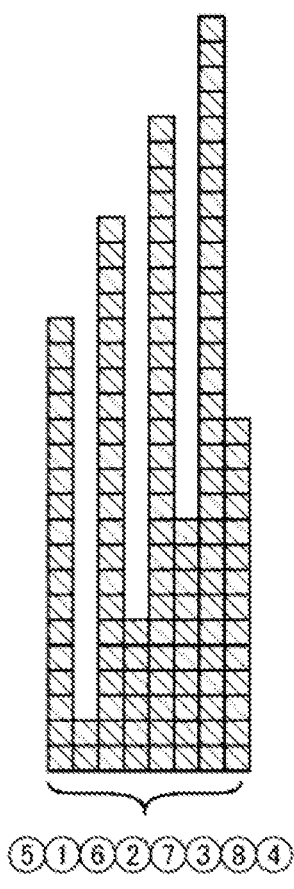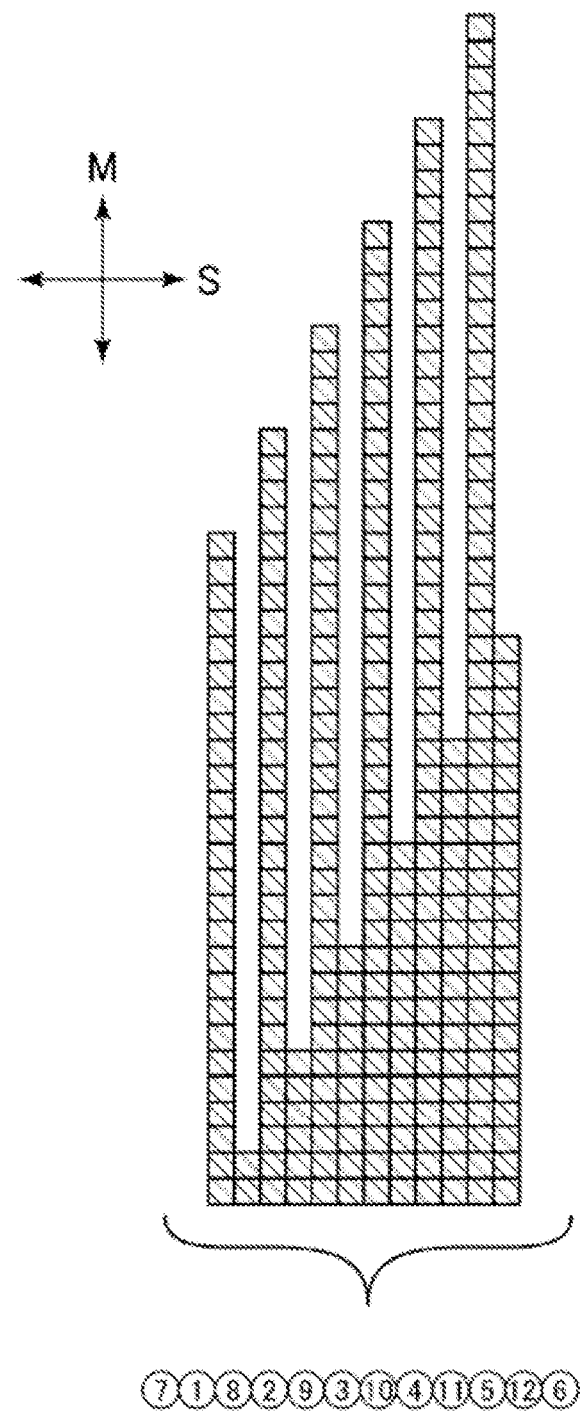
FIG. 17A
FIG. 17B

PAINTING ROBOT SYSTEM AND PAINTING METHOD

CROSS-REFERENCE TO RELATED APPLICATIONS

This application claims priority to Japan patent application Serial No.: JP 2021-051273, filed on Mar. 25, 2021; and which is herein incorporated by reference in its entirety.

FIELD

The present invention relates to a painting robot system and a painting method.

BACKGROUND

Robot painting using robots predominates in painting production lines for vehicles such as automobiles. In the robot painting, a painting machine (a rotary atomization type painting machine) having a rotary atomization type painting head mounted at a front end of an articulated robot is used. In addition, for example, as disclosed in Patent Literature 1, a structure including an inkjet printing head in a printing head (10) is disclosed.

Patent Literature 1: Japanese Patent No. 5976320

However, unlike the printing head (painting head) disclosed in Patent Literature 1, it is being studied to perform painting by using a painting head in which a nozzle column is inclined relative to a scanning direction of the painting head. In such a painting head, when the inclined nozzle column is further arranged in multiple layers in the main scanning direction, paint ejected from the nozzles of the nozzle columns on the other layers drop among droplets ejected from the nozzles of the same nozzle column. At this time, high-quality painting may be performed on the basis of image data with higher resolution.

In the case of performing painting by using the painting head with multiple layers of inclined nozzle columns, due to the special arrangement of the nozzles, painting is performed only in a forward path during reciprocating movement of the painting head, thereby preventing the deviation of landing positions of the droplets of the paint.

However, in order to improve the painting efficiency, preferably, in the special painting head as described above, painting can not only be performed in the forward path, but can also be performed in a backward path.

SUMMARY

The present invention is made in view of the above situations and is intended to provide a painting robot system that may perform painting well not only in a forward path but also in a backward path, and a painting method.

In order to solve the above problems, according to a first aspect of the present invention, a painting robot system is provided, including: a painting robot for painting a vehicle, and an image processing device for creating image data for painting the vehicle that is painted by the painting robot, the painting robot system is characterized in that the painting robot is provided with: a painting head, which is provided with a plurality of nozzles for ejecting droplets and a piezoelectric substrate for driving the nozzles to eject the droplets; a robot arm, which is provided with the painting head at a front end and causes the painting head to move toward a desired position; an arm control portion, which controls the driving of the robot arm; and a head control portion, which is arranged inside the painting head and controls the operation of the piezoelectric substrate, wherein the painting head is provided with: a nozzle column provided with a plurality of nozzles, the nozzle column is arranged obliquely relative to a long side direction of the painting head, the nozzle column is provided with a first nozzle column that is located on one side in a main scanning direction of the painting head, and a second nozzle column that is located on the other side in the main scanning direction, the first nozzle column and the second nozzle column are configured in a state where the droplets ejected from the nozzles in the second nozzle column when the long side direction of the painting head is orthogonal to the main scanning direction are ejected in the middle of the droplets ejected from adjacent nozzles in the first nozzle column, the image processing device is provided with: an image processing portion, which creates image data of each path for performing painting, that is, each painting path, of the painting head; and a memory, which stores the image data of each painting path corresponding to a painting sequence, and the image data is provided with: image data for a forward path for performing painting on the forward path of reciprocating movement in the main scanning direction of the painting head, and image data for a backward path for performing painting on the backward path of the reciprocating movement, when the distance between adjacent nozzles in each nozzle column is set as L1, the droplets are ejected from the nozzles in the first nozzle column earlier than the nozzles in the second nozzle column on the forward path, and when the number of nozzles in the first nozzle column or the second nozzle column is set as N, the image processing portion creates the image data for the forward path in a state of having first strip image data of a strip shape corresponding to nozzles in the first nozzle column and second strip image data of a strip shape corresponding to nozzles in the second nozzle column, the image processing portion creates the second strip image data as the image data for the backward path in a state of deviating relative to the first strip image data, the amount of position deviation is set as the following position: the Pth nozzle in the second nozzle column lands first relative to the Pth nozzle in the first nozzle column with an adjacent landing position at a distance of multiplying the number N by twice of the distance L1, and the head control portion reads the image data for the forward path from the memory on the forward path of the painting head and controls the operation of the piezoelectric substrate on the basis of the image data for the forward path, and reads the image data for the backward path from the memory on the backward path of the painting head and controls the operation of the piezoelectric substrate on the basis of the image data for the backward path.

In addition, in the above invention, preferably, the arm control portion or the image processing portion forms a trajectory of the painting head moving relative to the vehicle is within a predetermined height range, that is, trajectory data, and the image data is formed along the trajectory data.

In addition, in the above invention, preferably, the arm control portion controls the robot arm, so that the long side direction of the painting head is orthogonal to the main scanning direction.

In addition, in the above invention, preferably, when the image processing portion creates the image data in the same path, the image data for the forward path and the image data for the backward path are formed to have the same number of points.

In addition, in order to solve the above problems, according to the first aspect of the present invention, a painting method is provided, in which image data for painting a vehicle that is painted by a painting robot for painting the vehicle is created by an image processing device, and painting is performed, the painting method is characterized in that the painting robot is provided with: a painting head, which is provided with a plurality of nozzles for ejecting droplets and a piezoelectric substrate for driving the nozzles to eject the droplets; a robot arm, which is provided with the painting head at a front end and causes the painting head to move toward a desired position; an arm control portion, which controls the driving of the robot arm; and a head control portion, which is arranged inside the painting head and controls the operation of the piezoelectric substrate, wherein the painting head is provided with: a nozzle column provided with a plurality of nozzles, the nozzle column is arranged obliquely relative to a long side direction of the painting head, the nozzle column is provided with a first nozzle column that is located on one side in a main scanning direction of the painting head, and a second nozzle column that is located on the other side in the main scanning direction, the first nozzle column and the second nozzle column are configured in a state where the droplets ejected from the nozzles in the second nozzle column when the long side direction of the painting head is orthogonal to the main scanning direction are ejected in the middle of the droplets ejected from adjacent nozzles in the first nozzle column, the image processing device is provided with: an image processing portion, which creates image data of each path for performing painting, that is, each painting path, of the painting head; and a memory, which stores the image data of each painting path corresponding to a painting sequence, and the painting method includes: a first image data creation step: when the distance between adjacent nozzles in each nozzle column is set as L1, the droplets are ejected from the nozzles in the first nozzle column earlier than the nozzles in the second nozzle column on a forward path, and when the number of nozzles in the first nozzle column or the second nozzle column is set as N, creating, by the image processing portion, image data for the forward path in a state of having first strip image data of a strip shape corresponding to nozzles in the first nozzle column and second strip image data of a strip shape corresponding to nozzles in the second nozzle column; a second image data creation step: creating, by the image processing portion, the second strip image data as image data for a backward path in a state of deviating relative to the first strip image data, wherein the amount of position deviation is set as the following position: the Pth nozzle in the second nozzle column lands first relative to the Pth nozzle in the first nozzle column with an adjacent landing position at a distance of multiplying the number N by twice of the distance L1; a storage step: storing the image data for the forward path and the image data for the backward path in the memory corresponding to a painting sequence; a forward path painting execution step: reading the image data for the forward path from the memory on the forward path of the painting head, and controlling, by the head control portion, the operation of the piezoelectric substrate on the basis of the image data for the forward path, so as to perform painting on the vehicle; and a backward path painting execution step: before or after the forward path painting execution step, reading the image data for the backward path from the memory on the backward path of the painting head, and controlling, by the head control portion, the operation of the piezoelectric substrate on the basis of the image data for the backward path, so as to perform the painting on the vehicle.

According to the present invention, it is possible to provide a painting robot system that may perform painting well not only in a forward path but also in a backward path, and a painting method.

DESCRIPTION OF DRAWINGS

FIG. 4 is a diagram showing a state where a plurality of painting heads are configured in a staggered manner in the painting robot shown in FIG. 1.

Figure 2:
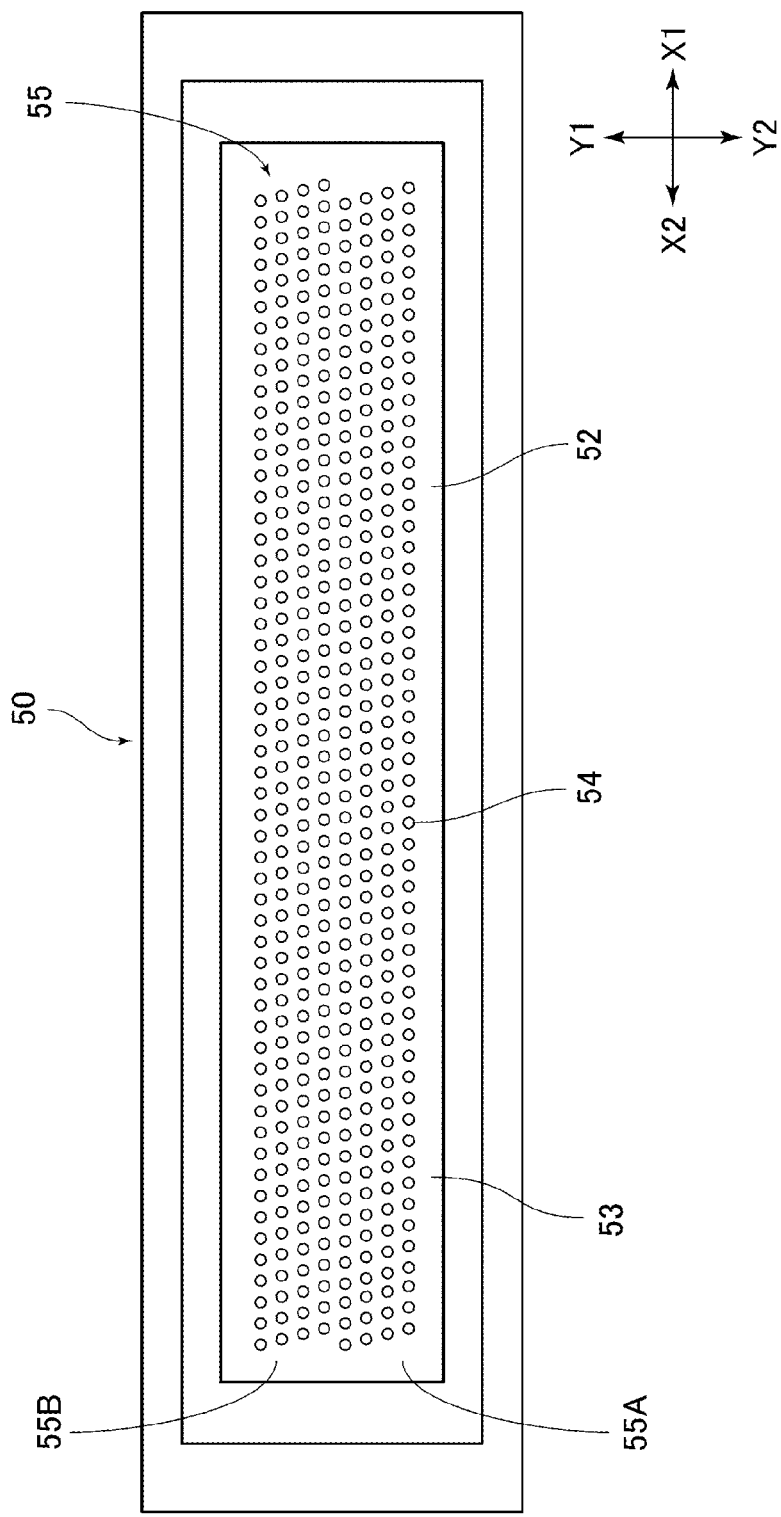
FIG. 2 is a diagram showing a front view state of a nozzle forming surface for ejecting paint from the painting robot shown in FIG. 1.

It is a top view showing the structure of the nozzle forming surface of another painting head unit different from the painting head unit shown in FIG. 2.

Figure 9:
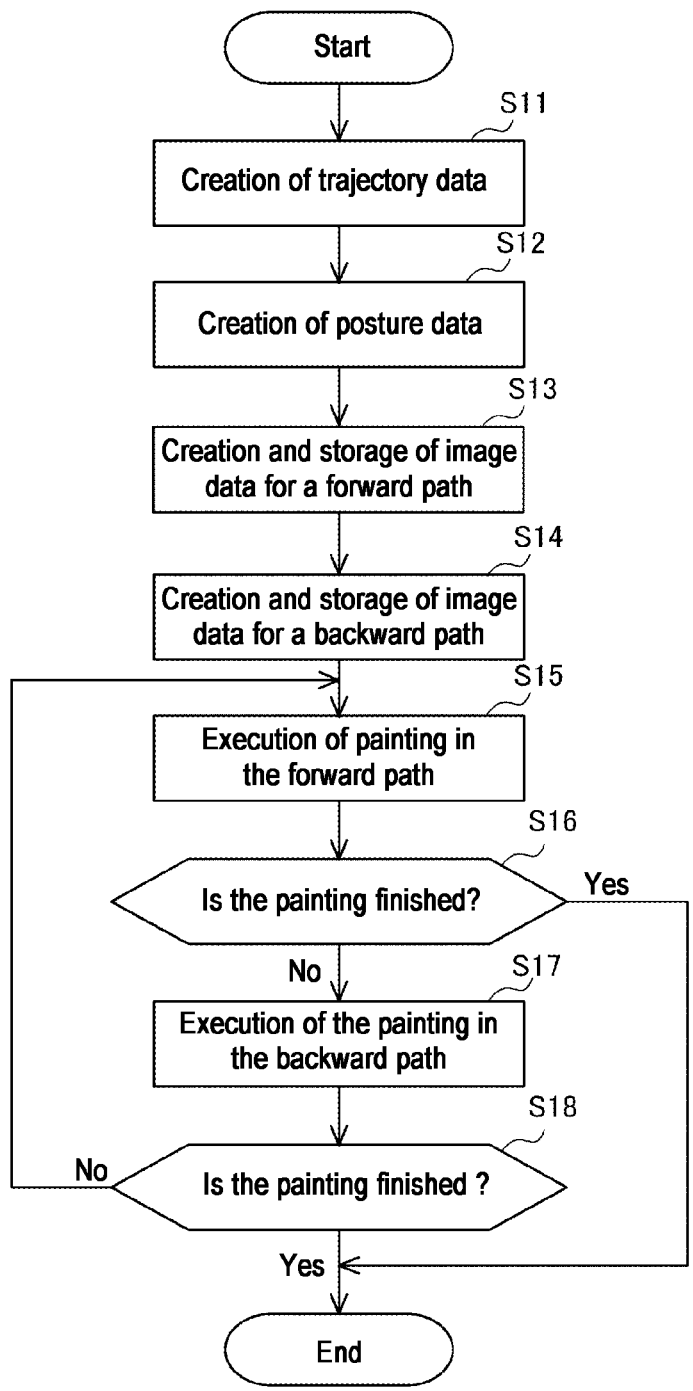

FIG. 9 is a flow diagram showing an outline of a painting method using the painting robot and the painting robot system of the present embodiment.

Figure 3A:
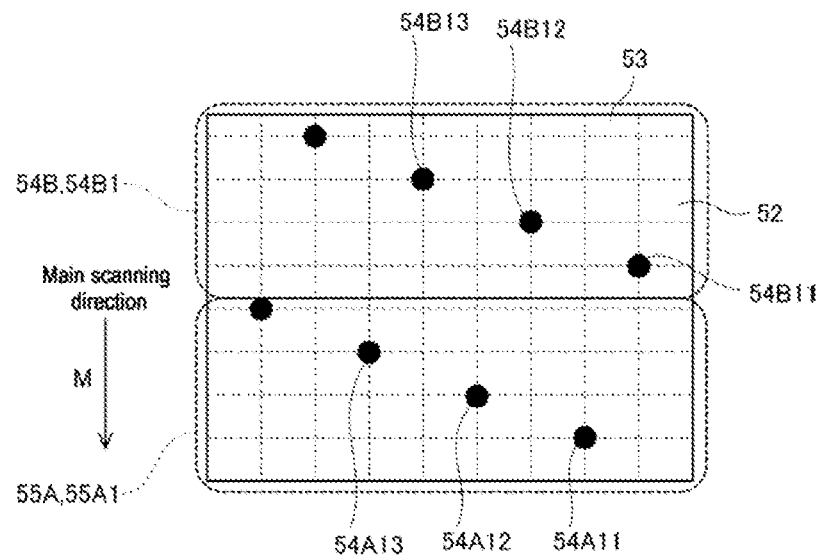
FIG. 3A illustrates a partial top view showing the configuration of each nozzle on the nozzle forming surface in a nozzle head unit of the painting machine for a vehicle shown in FIG. 1.
Figure 10A:
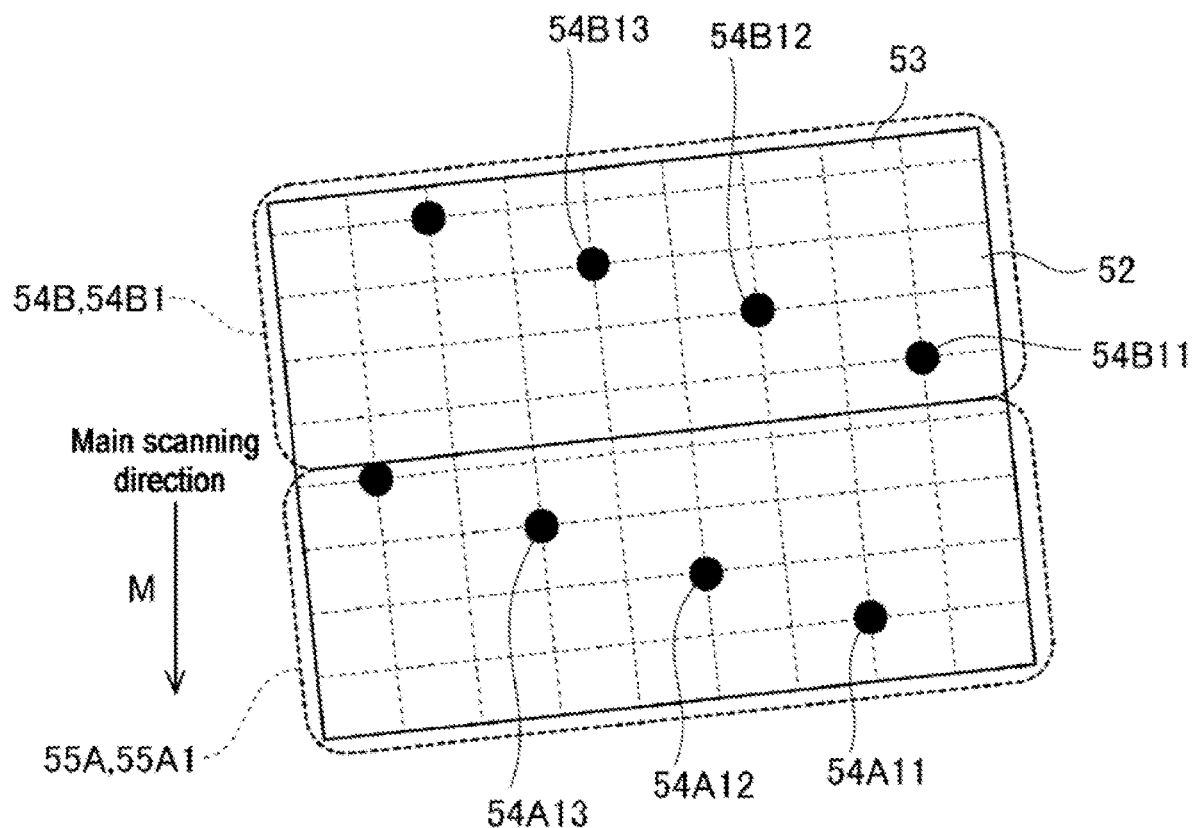

FIG. 10A is a diagram showing an image in which a long side direction of the nozzle head unit is not maintained perpendicular but is inclined relative to FIG. 3A.

Figure 10B:
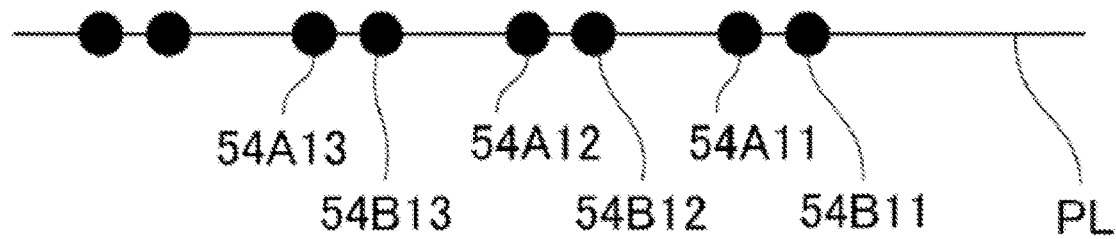

FIG. 10B illustrates a result of ejecting paint from each nozzle when the nozzle head unit shown in FIG. 10A is inclined.

Figure 11:
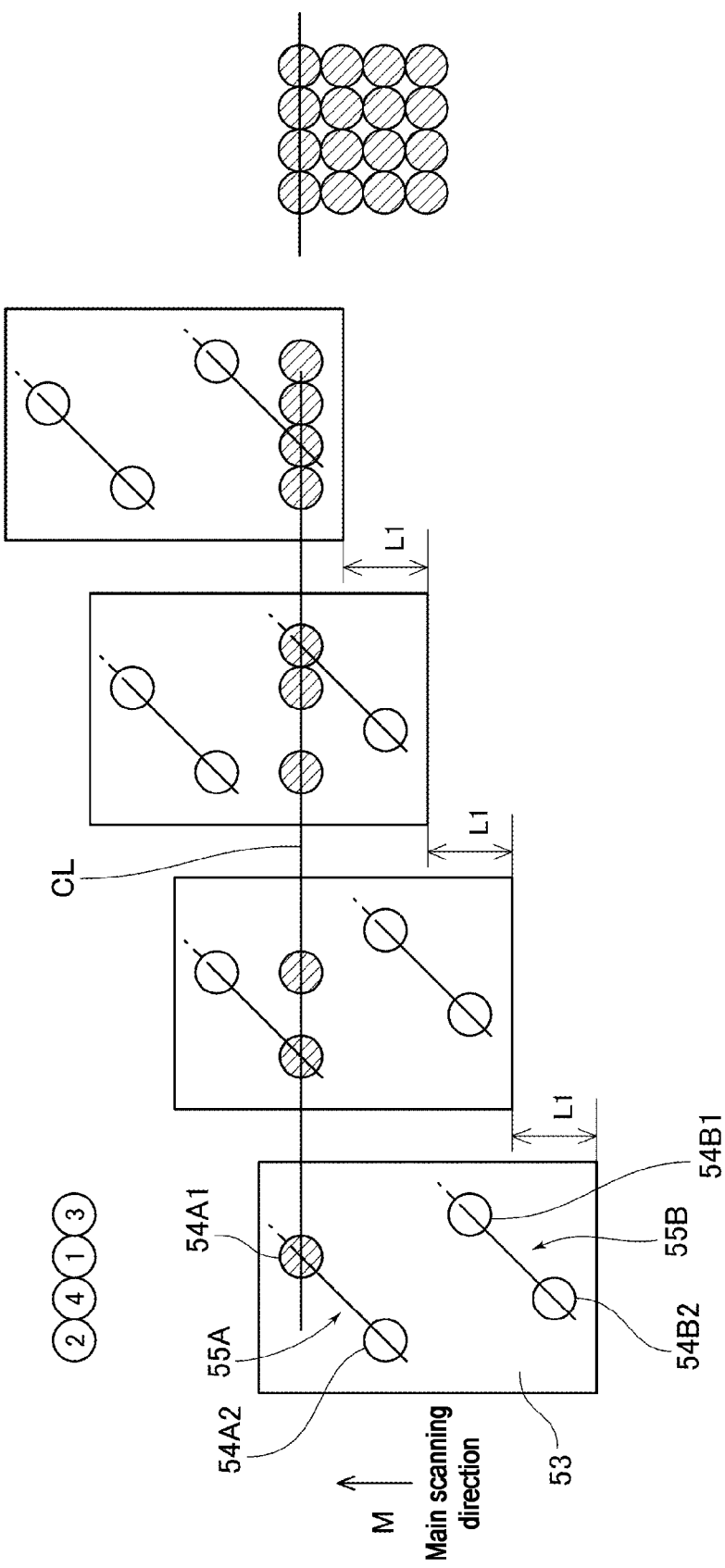

FIG. 11 is a diagram showing a landing image of droplets of the paint related to image data for a forward path created in the painting robot system of the present embodiment.

Figure 12:
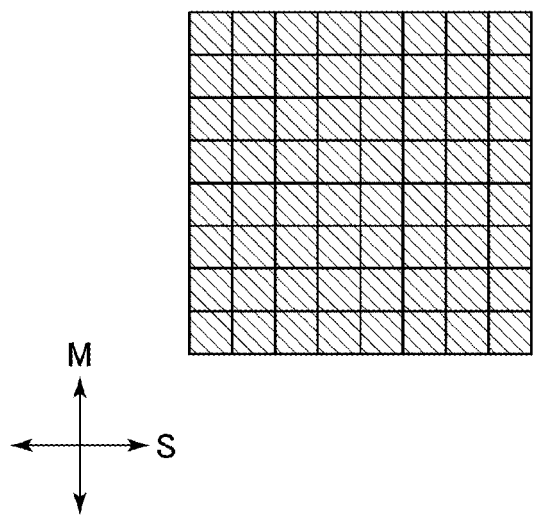

FIG. 12 is a diagram showing image data (the image data for the forward path) in the case shown in FIG. 11.

Figure 13:
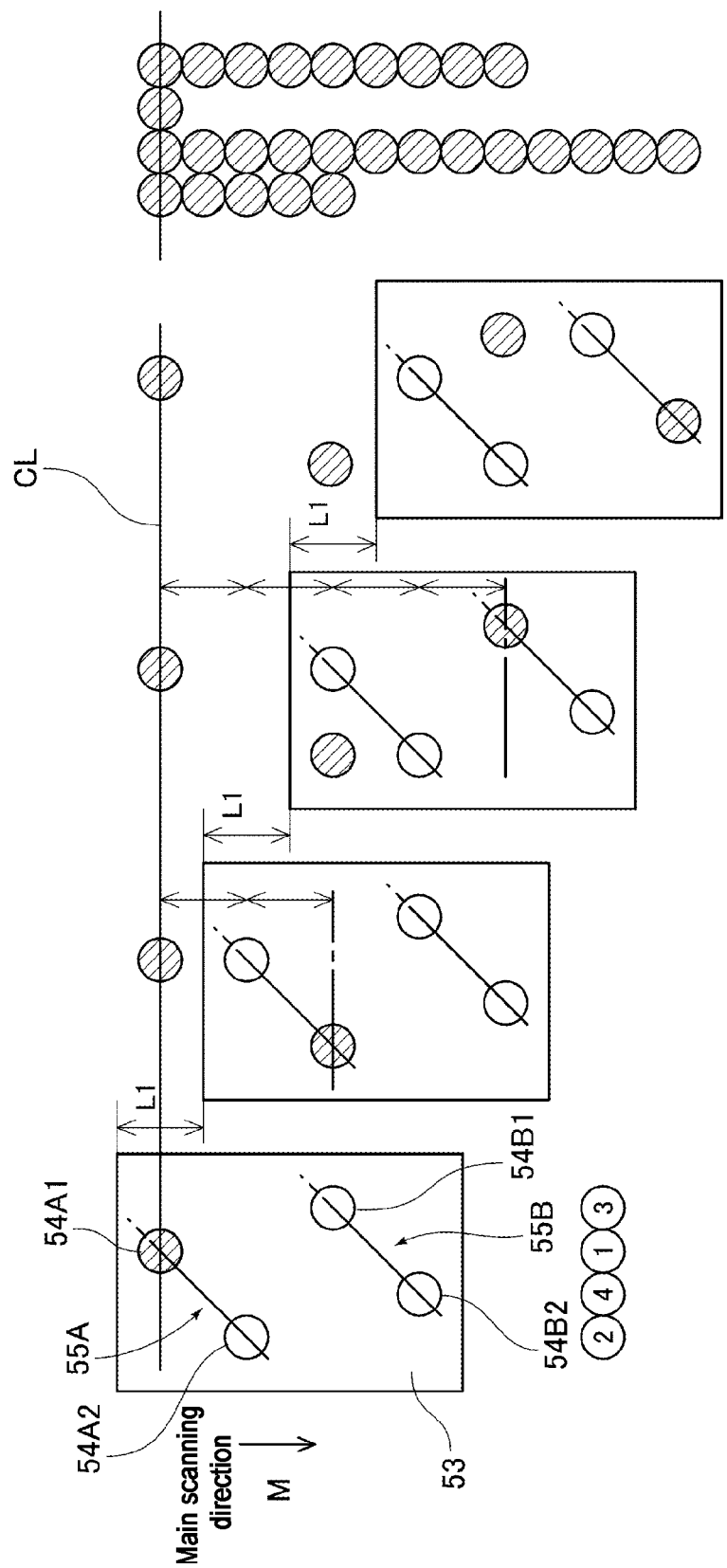

FIG. 13 is a diagram showing a situation of the landing positions of the droplets when the droplets are ejected from the nozzles in the same sequence as that of FIG. 11 in a backward path of the painting head that performs a reciprocating action.

Figure 14:
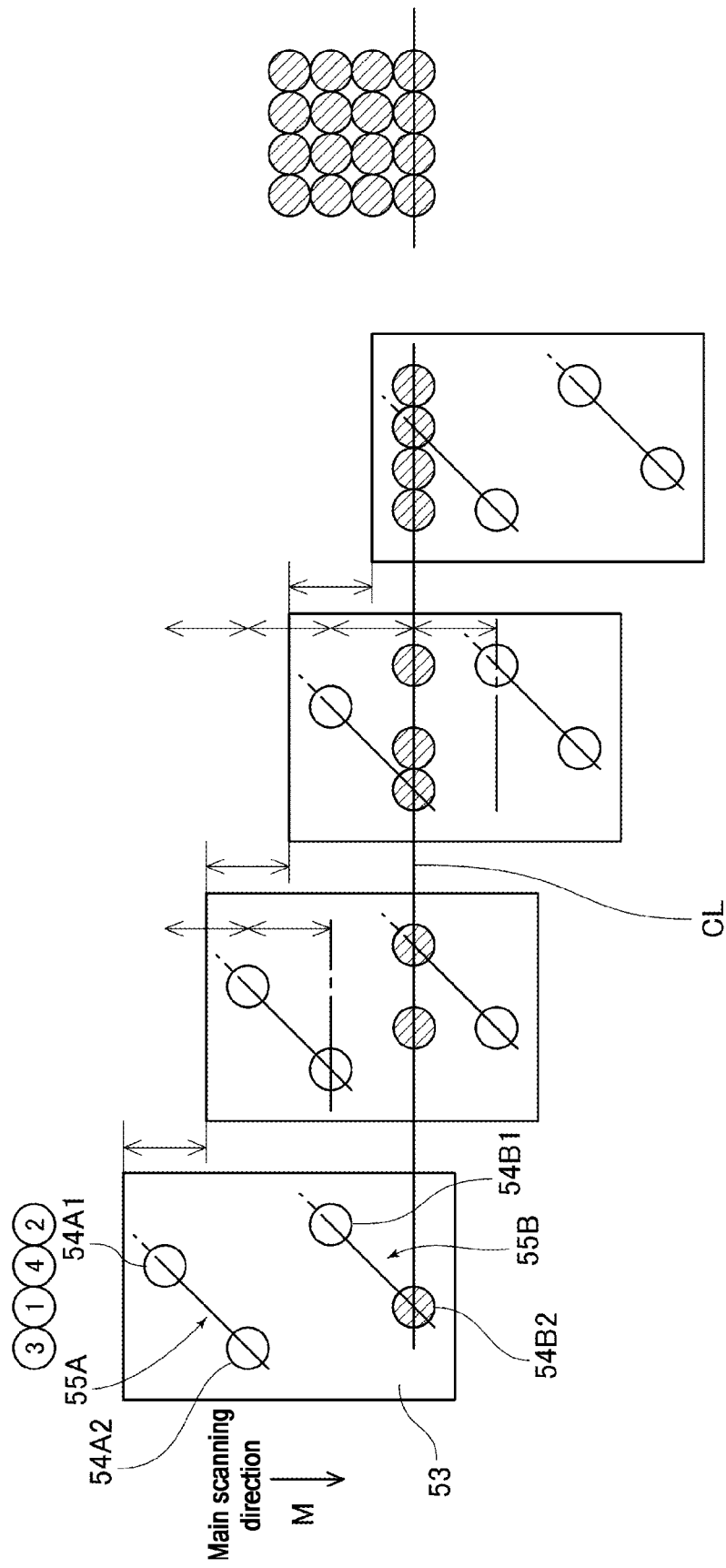

FIG. 14 is a diagram showing an image without deviation of the landing positions of the droplets in an arbitrary painting production line in the backward path of the painting head that performs the reciprocating action.

Figure 15:
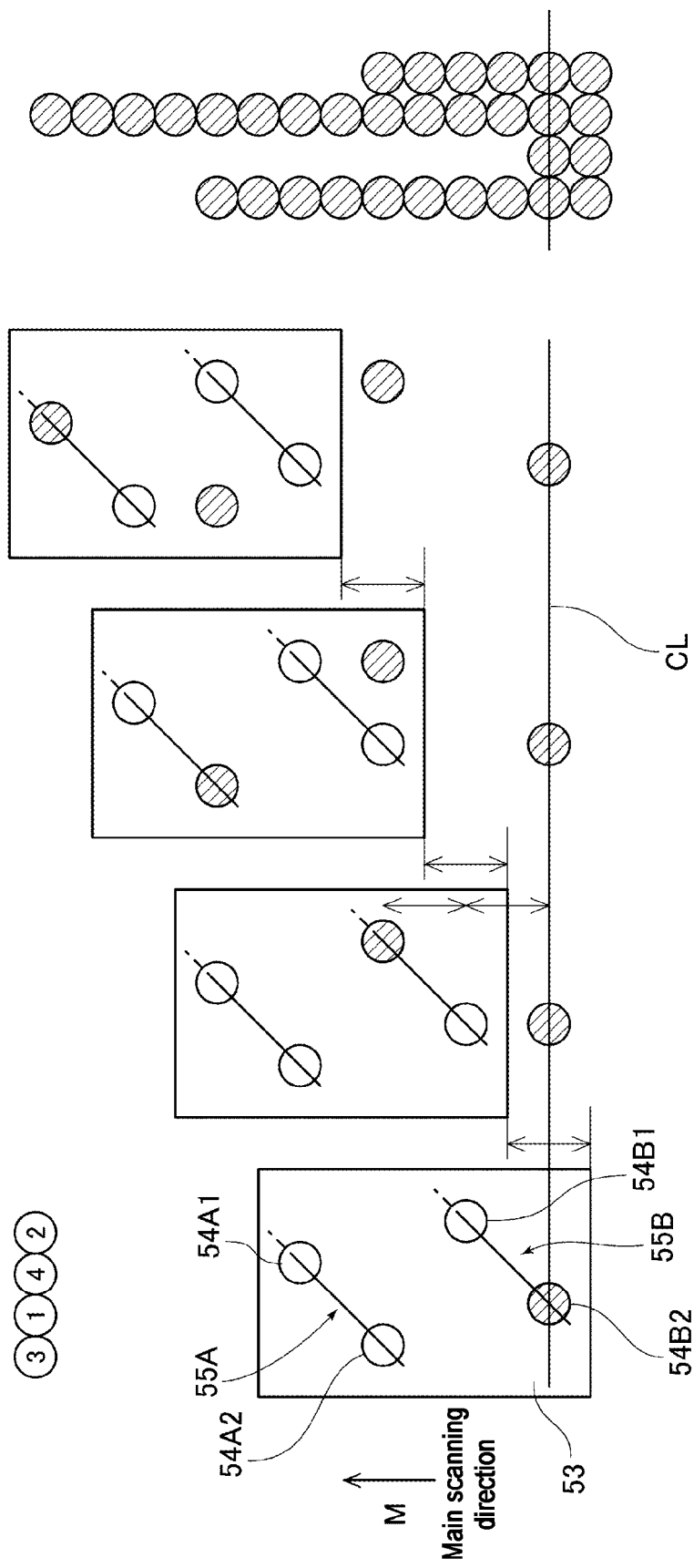

FIG. 15 is a diagram showing a state where the ejection sequence of the droplets from the nozzles without deviation of the landing positions of the droplets in the arbitrary painting production line shown in FIG. 14 is replaced with the movement of the painting head along the forward path (forward direction) of a main scanning direction.

Figure 16:
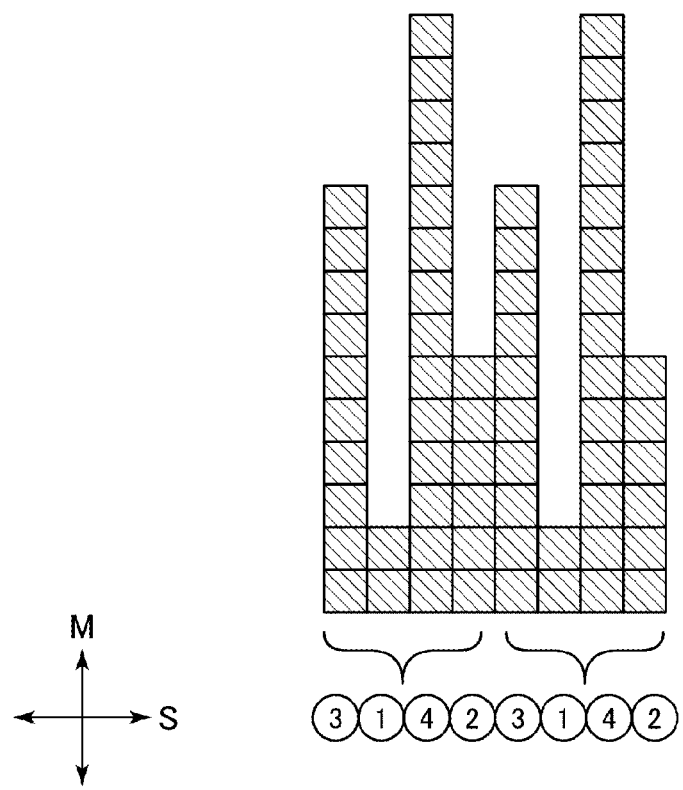

FIG. 16 is a diagram showing image data (image data for a backward path) in the case shown in FIG. 15.

FIG. 17A is a diagram showing the image data for the backward path when the number of nozzles in a first nozzle column and a second nozzle column is 4.

FIG. 17B is a diagram showing the image data when the number of nozzles in the first nozzle column and the second nozzle column is 8.

Figure 18:
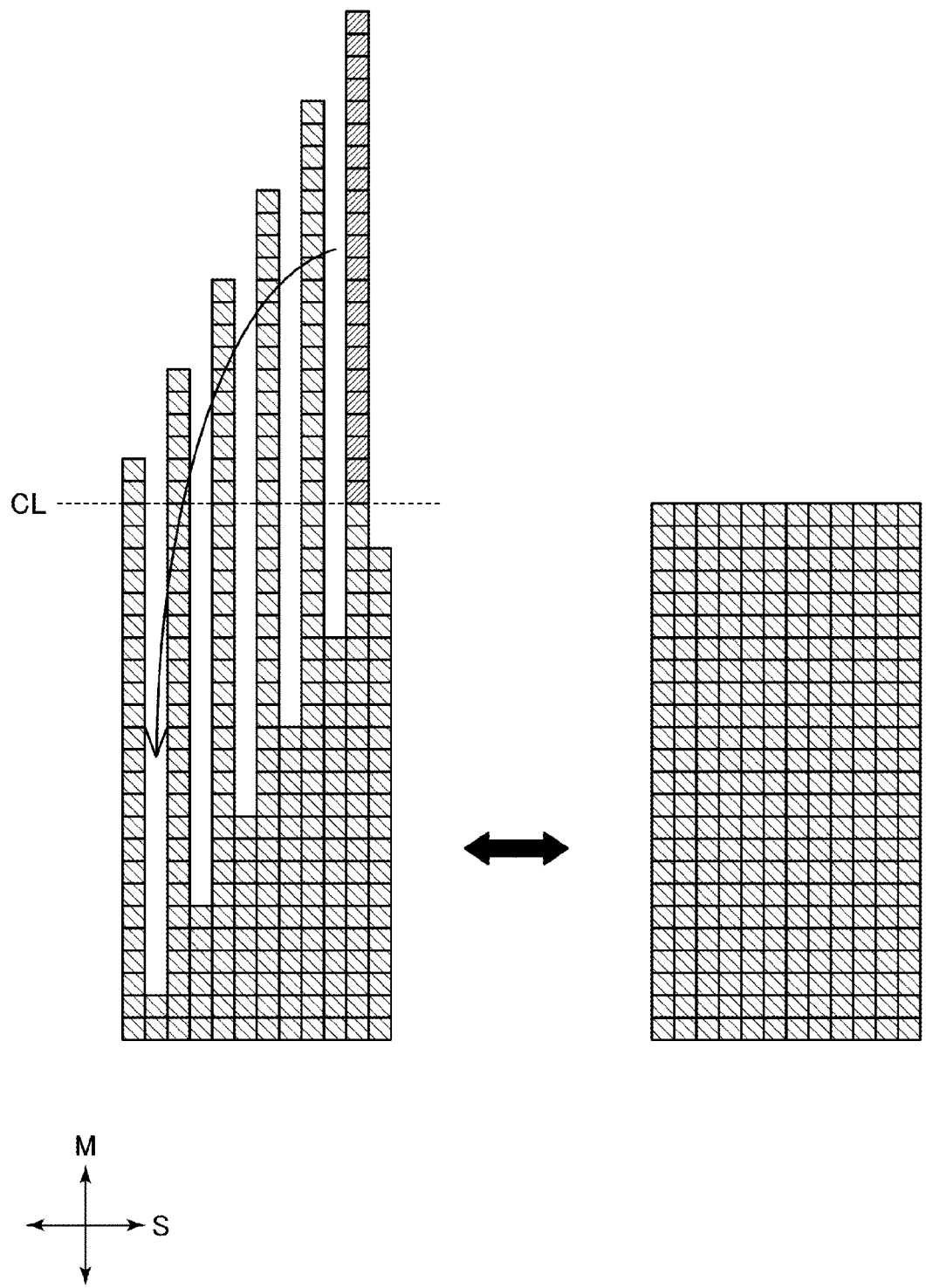

FIG. 18 is a diagram for illustrating a state where the total number of pixels (the total number of points) of the image data for the forward path and the image data for the backward path is the same.

DETAILED DESCRIPTION OF EMBODIMENTS

Hereinafter, a painting robot system 11 having a painting robot 10 involved in various embodiments of the present invention will be described based on the drawings. In addition, in the following description, as needed, an X direction is a long side direction of a nozzle forming surface 52 (a painting head 53), an X1 side is a right side of FIG. 2, and an X2 side is a left side of FIG. 2. In addition, a Y direction is a short side direction (a width direction) of the nozzle forming surface 52 (the painting head 53), a Y1 side is an upper side of a paper surface in FIG. 2, and a Y2 side is a lower side of the paper surface in FIG. 2.

The painting robot system 11 of the present embodiment is provided with the painting robot 10 and an image processing device 200. Among these, the painting robot 10 is a device for "painting" a painting target object relative to a vehicle or a vehicle component (hereinafter, the vehicle component becoming a portion of the vehicle is also regarded as the vehicle for description) located on a painting production line in an automobile manufacturing plant, so as to form a painting film on the surface of the painting target object to provide protection and beauty to the surface thereof. Therefore, it is necessary to perform painting with desired painting quality within a certain period of time relative to a vehicle moving along the painting production line every predetermined time.

In addition, in the painting robot 10 of the present embodiment, not only the above painting film may be formed, but also various appearance designs and images may be formed relative to the painting target object such as a vehicle and a vehicle component.

1-1. Regarding the Overall Structure of the Painting Robot 10

Figure 1:
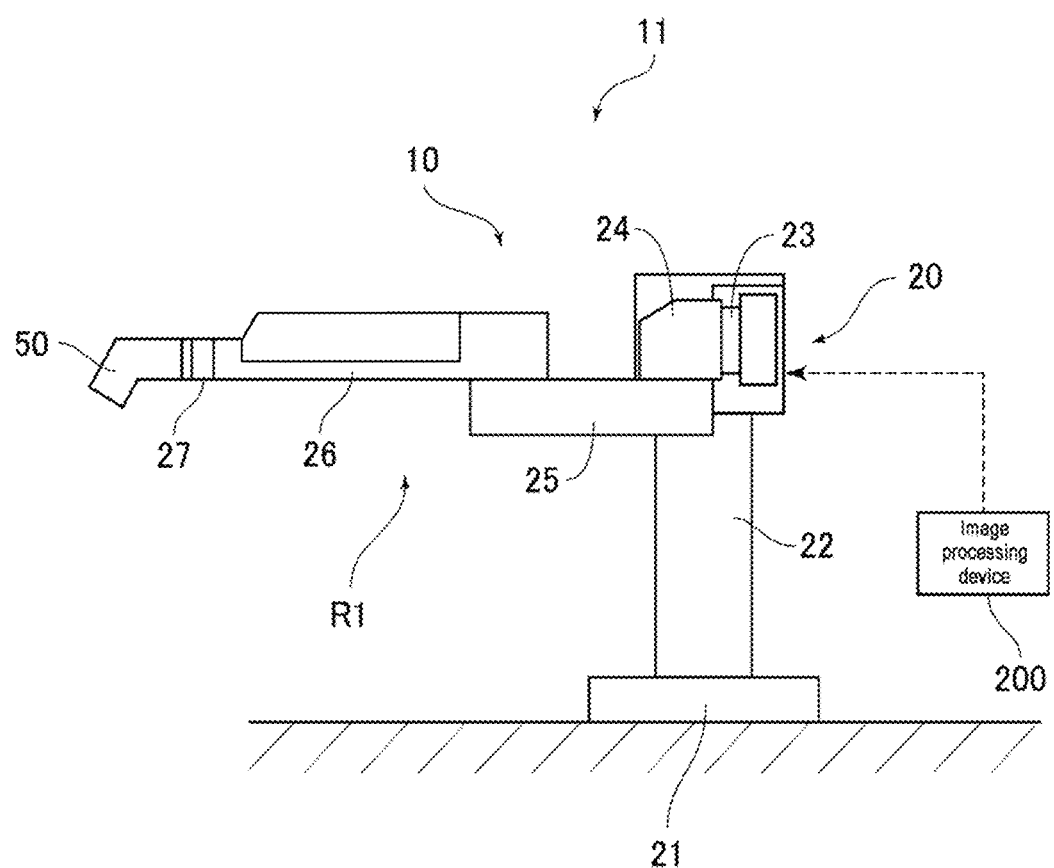
FIG. 1 is a schematic diagram showing an overall structure of a painting robot and a painting robot system involved in an embodiment of the present invention.

Firstly, the painting robot 10 in the painting robot system 11 will be described. FIG. 1 is a schematic diagram showing an overall structure of the painting robot system 11 and the painting robot 10 involved in an embodiment of the present invention. As shown in FIG. 1, the painting robot system 11 takes the painting robot 10 and the image processing device 200 as main components. In addition, the painting robot 10 takes a robot main body 20 and a painting head unit 50 as main components.

1-2. Regarding the Robot Main Body

As shown in FIG. 1, the robot main body 20 takes a base 21, a leg portion 22, a rotating shaft portion 23, a rotating arm 24, a first rotating arm 25, a second rotating arm 26, a wrist portion 27, and motors M1 to M6 for driving them (referring to FIG. 8) as the main components. In addition, a portion from the rotating shaft portion 23 to the wrist portion 27 corresponds to a robot arm R1, but other portions excluding, for example, the leg portion 22 may also correspond to the robot arm R1.

Among these, the base 21 is a portion arranged at an arrangement location such as the ground, but the base 21 may also be able to travel relative to the arrangement location. In addition, the leg portion 22 is a portion erected from the base 21 toward an upper portion. In addition, a joint portion may also be arranged between the leg portion 22 and the base 21, so that the leg portion 22 may rotate relative to the base 21.

In addition, the rotating shaft portion 23 is arranged at an upper end of the leg portion 22. The rotating arm 24 is installed on the rotating shaft portion 23 in a freely rotatable state.

In addition, the rotating arm 24 is driven by the motor M1 to rotate, but as such a motor, an electric motor or a pneumatic motor may be used.

In addition, one end side of the first rotating arm 25 is installed on the rotating arm 24 in a rotatable state. In addition, the motor M2 that drives the first rotating arm 25 to rotate relative to the rotating shaft portion 23 may be accommodated in a shell of the rotating arm 24, and may also be accommodated in the shell of the first rotating arm 25.

In addition, one end side of the second rotating arm 26 is installed on the other end side of the first rotating arm 25 via a shaft portion in a freely swingable state. The motor M3 that drives the second rotating arm 26 to rotate relative to the first rotating arm 25 may be accommodated in the shell of the first rotating arm 25, and may also be accommodated in the shell of the second rotating arm 26.

The wrist portion 27 is installed on the other end side of the second rotating arm 26. The wrist portion 27 may perform a rotational movement around a plurality of (for example, three) shaft portions with different orientations as the center. Thereby, the orientation of the painting head unit 50 may be controlled with high precision. In addition, several shaft portions may be provided as long as the number is two or more.

The motors M4 to M6 are provided in order to enable such a wrist portion 27 to perform the rotational movement with the each shaft portion as the center. In addition, the motors M4 to M6 are accommodated in the shell of the second rotating arm 26, but they may also be accommodated in other locations.

In addition, the painting head unit 50 is installed on the arm portion 27 by means of a bracket portion that is not shown in the figure. That is, the painting head unit 50 is detachably arranged on the arm portion 27 by means of the bracket portion.

In addition, the above-mentioned painting robot 10 equipped with the rotating shaft portion 23, the rotating arm 24, the first rotating arm 25, the second rotating arm 26, the wrist portion 27, and the motors M1 to M6 for driving them is a robot that may be driven by 6 axes. However, the painting robot 10 may be a robot that is driven by any number of axes greater than 4.

1-3. Regarding the Painting Head Unit

Next, the painting head unit 50 will be described. The painting head unit 50 is installed on the wrist portion 27 by means of a chuck portion 30. FIG. 2 is a diagram showing a front view state of the nozzle forming surface 52 for ejecting paint from the painting head unit 50. As shown in FIG. 2, the painting head unit 50 is provided with a head cover which is not shown in figure, and various structures are built in the head cover. In addition, examples of the structures built in the head cover include a paint circulation path, that is, a head side circulation path (not shown in the figure), a head control portion 130, etc.

Figure 3B:
FIG. 3B illustrates a result of ejecting paint from each nozzle.
Figure 3C:
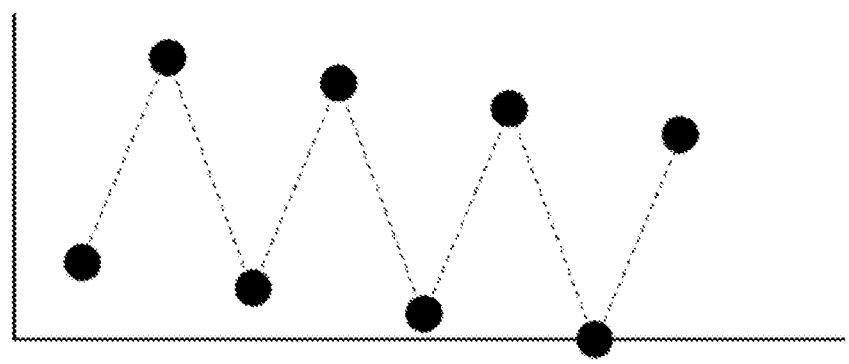
FIG. 3C illustrates a driving moment of each nozzle.

FIG. 3A illustrates a partial top view showing the configuration of each nozzle 54 on the nozzle forming surface 52, FIG. 3B illustrates a result of ejecting the paint from each nozzle 54, and FIG. 3C illustrates a driving moment of each nozzle 54. In addition, in FIG. 3A, for the convenience of description, a secondary scanning direction (an X direction) is shown in a state where it is greatly stretched. For example, on the leftmost side of the painting head 53 in FIG. 2, there are a total of two layers of nozzle columns 55 composing of a nozzle column 55 that is composed of a total of 4 nozzles 54 on a depth side of the paper surface of FIG. 2 and nozzle column 55 that is composed of a total of 4 nozzles 54 on a front side of the paper surface of FIG. 2, but a state corresponds to FIG. 3A, where these 2 (2 layers of) nozzle columns 55 are taken out, a main operation direction (the X direction) remains unchanged without being stretched, and the main scanning direction (the X direction) is greatly stretched.

As shown in FIGS. 2 and 3A, the nozzle forming surface 52 is provided with a plurality of nozzle columns 55 in which the nozzles 54 are arranged in a column in a direction inclined relative to the long side direction of the painting head unit 50. In addition, in FIG. 3C, a longitudinal axis represents time (driving moment), and a horizontal axis represents positions of a total of 4 nozzles 54A and a total of 4 nozzles 54B in the X direction. In addition, in the above description, the long side of the painting head unit 50 refers to a longer direction (a lateral width direction) of the painting head in FIG. 2.

In the present embodiment, such a nozzle column 55 is provided with a first nozzle column 55A existing on one side (the Y2 side) of the main scanning direction (the Y direction) and a second nozzle column 55B existing on the other side (the Y1 side) of the main scanning direction. In the first nozzle column 55A and the second nozzle column 55B, the nozzle column located on the side (the left side) closest to the secondary scanning direction of FIG. 2 is respectively shown in FIG. 3 as a first nozzle column 55A1 and a second nozzle column 55B1.

Here, if the nozzles 54A, 54B in the first nozzle column 55A1 and the second nozzle column 55B1 are projected on a straight line (a projection straight line PL) along the secondary scanning direction of FIG. 3B, the first nozzle 54A11 counted starting from the Y1 side of the first nozzle column 55A1 is located between the first nozzle 54B11 and the second nozzle 54B12 counted starting from the Y1 side of the second nozzle column 55B1 on the projection straight line PL. In addition, the second nozzle 54A12 counted starting from the Y1 side of the first nozzle column 55A1 is located between the second nozzle 54B12 and the third nozzle 54B13 counted starting from the Y1 side of the second nozzle column 55B1. Hereinafter, similarly, between adjacent nozzles 54B in the second nozzle column 55B, the nozzles 54A in the first nozzle column 55A are located on the above projection straight line PL.

Therefore, in the state where the painting head unit 50 is scanning, by controlling the ejection moment of the droplets ejected from the respective nozzles 54A and 54B as shown in FIG. 3C, the droplets may land on the straight line in the secondary scanning direction as shown in FIG. 3B. As it were, the nozzle columns 55 are configured such that the landing positions of the droplets of adjacent nozzle columns 55 are staggered by a half pitch. Thereby, it is possible to increase the point density while painting.

However, as shown in FIG. 2, a single painting head 53 exists on the nozzle forming surface 52. However, a head group composed of a plurality of painting heads 53 may also exist on the nozzle forming surface 52. In this case, as an example, as shown in FIG. 4, a structure in which a plurality of painting heads 53 are aligned and are configured in a staggered manner may be cited, but the configuration of the painting heads 53 of the head group may be not staggered.

Figure 5:
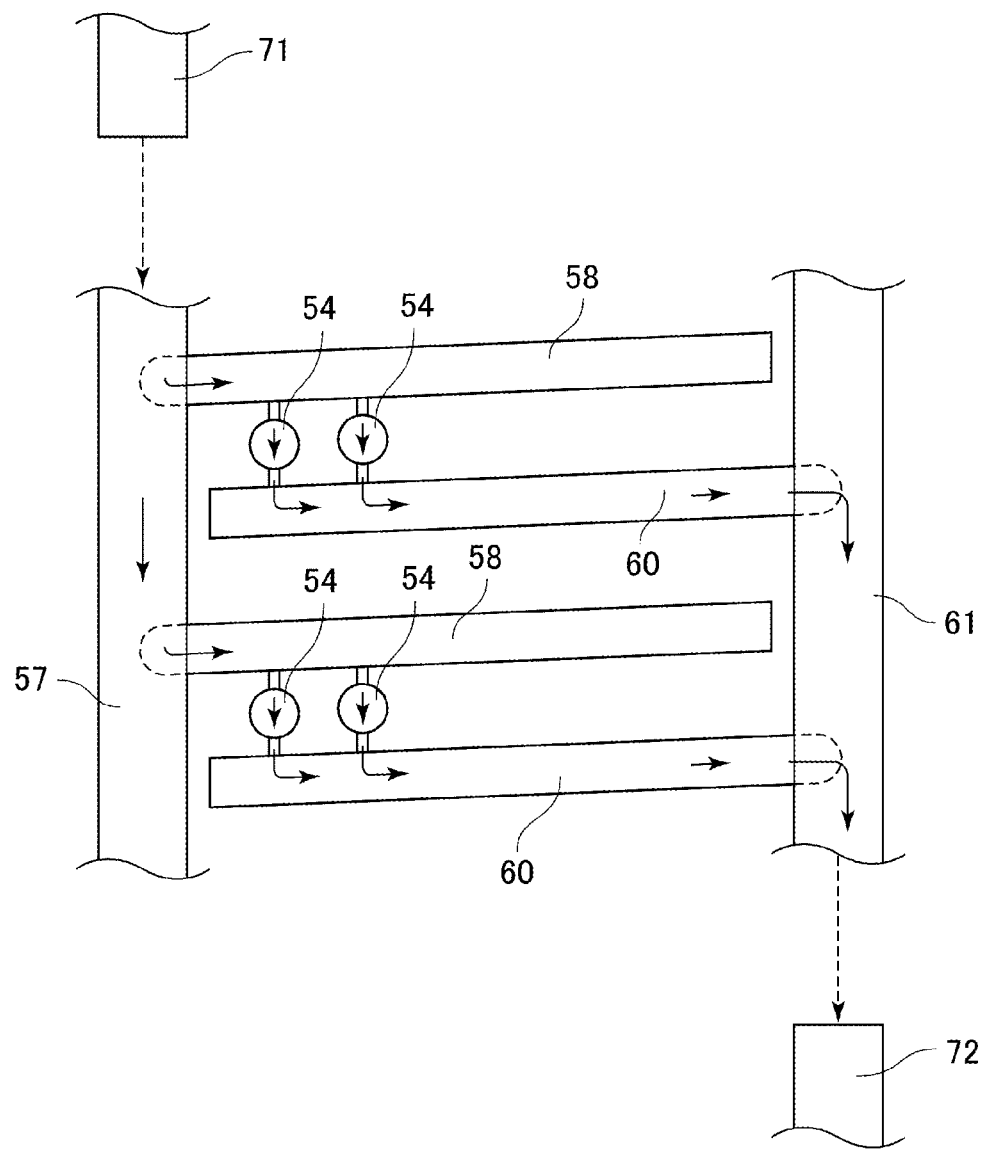
FIG. 5 is a diagram showing an overall structure for supplying paint to each nozzle in the painting robot shown in FIG. 1.
Figure 6:
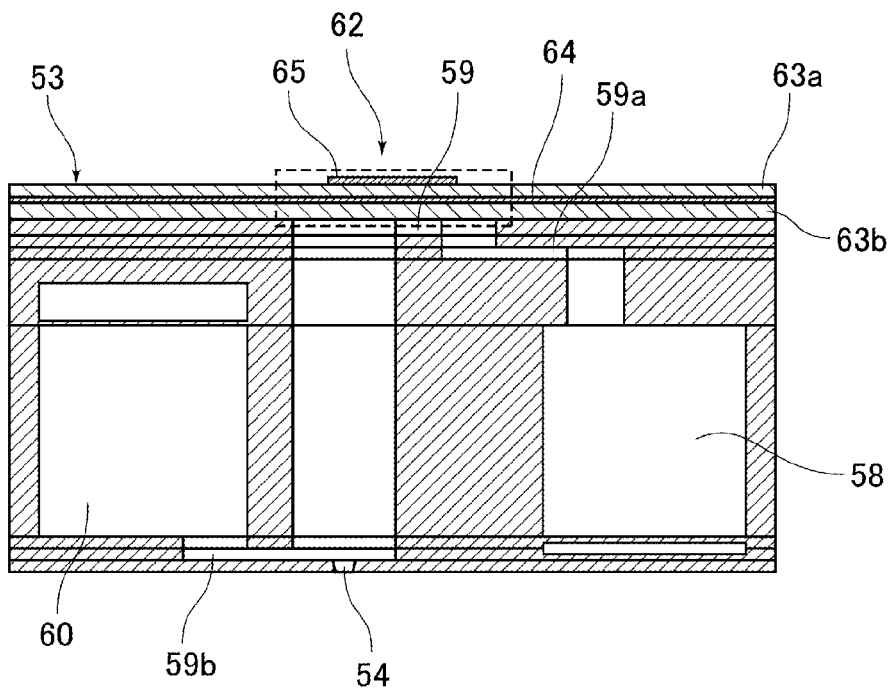
FIG. 6 is a cross-sectional view showing a structure in the vicinity of a column direction supply flow path, a nozzle pressurizing chamber and a column direction discharge flow path shown in FIG. 5.

FIG. 5 is a diagram showing an overall structure for supplying paint to each nozzle 54. FIG. 6 is a cross-sectional view showing a structure in the vicinity of a column direction supply flow path 58, a nozzle pressurizing chamber 59 and a column direction discharge flow path 60. As shown in FIGS. 5 and 6, the painting head 53 is provided with a supply side large flow path 57, the column direction supply flow path 58, the nozzle pressurizing chamber 59, the column direction discharge flow path 60, and a discharge side large flow path 61. The supply side large flow path 57 is a flow path for supplying paint from a supply path 71 of a head side circulation path described later. In addition, the column direction supply flow path 58 is a flow path in which the paint in the supply side large flow path 57 diverges.

In addition, the nozzle pressurizing chamber 59 is connected with the column direction supply flow path 58 through a nozzle supply flow path 59a. As a result, the paint is supplied to the nozzle pressurizing chamber 59 from the column direction supply flow path 58. The nozzle pressurizing chamber 59 is provided corresponding to the number of nozzles 54 and can eject the paint inside from the nozzle 54 by using a driving element described later.

In addition, the nozzle pressurizing chamber 59 is connected with the column direction discharge flow path 60 through a nozzle discharge flow path 59b. Therefore, the paint that is not ejected from the nozzle 54 is discharged from the nozzle pressurizing chamber 59 via the nozzle discharge flow path 59b toward the column direction discharge flow path 60. In addition, the column direction discharge flow path 60 is connected with the discharge side large flow path 61. The discharge side large flow path 61 is a flow path in which the paint discharged from various column direction discharge flow paths 60 merges. The discharge side large flow path 61 is connected with a return path 72 of the head side circulation path.

According to such a structure, the paint supplied from the supply path 71 of the head side circulation path is ejected from the nozzle 54 by means of the supply side large flow path 57, the column direction supply flow path 58, the nozzle supply flow path 59a and the nozzle pressurizing chamber 59. In addition, the paint that is not ejected from the nozzle 54 returns from the nozzle pressurizing chamber 59 to the return path 72 of the head side circulation path by means of the nozzle discharge flow path 59b, the column direction discharge flow path 60 and the discharge side large flow path 61.

In addition, in the structure shown in FIG. 5, one column direction supply flow path 58 is configured to correspond to one column direction discharge flow path 60. However, it may also be configured such that one column direction supply flow path 58 corresponds to a plurality of (for example, two) column direction discharge flow paths 60. In addition, it may also be configured such that a plurality of column direction supply flow paths 58 correspond to one column direction discharge flow path 60.

In addition, as shown in FIG. 6, a piezoelectric substrate 62 is configured on a top surface (the surface on an opposite side of the nozzle 54) of the nozzle pressurizing chamber 59. The piezoelectric substrate 62 is provided with two piezoelectric ceramic layers 63a and 63b, which serve as piezoelectric bodies, and is also provided with a common electrode 64 and individual electrodes 65. The piezoelectric ceramic layers 63a and 63b are members that may expand and contract by applying a voltage from the outside. As such piezoelectric ceramic layers 63a and 63b, ceramic materials with high dielectricity such as lead zirconate titanate (PZT) series, NaNbO3 series, BaTiO3 series, (BiNa)NbO3 series, and BiNaNb5O15 series may be used.

In addition, as shown in FIG. 6, the common electrode 64 is configured between the piezoelectric ceramic layer 63a and the piezoelectric ceramic layer 63b. In addition, a surface electrode (not shown in the figure) for the common electrode is formed on an upper surface of the piezoelectric substrate 62. The common electrode 64 and the surface electrode for the common electrode are electrically connected by a through conductor which is not shown in figure and exists on the piezoelectric ceramic layer 63a. In addition, the individual electrodes 65 are respectively configured at positions opposite to the nozzle pressurizing chamber 59. Further, a portion of the piezoelectric ceramic layer 63a sandwiched between the common electrode 64 and the individual electrode 65 is polarized in a thickness direction. Therefore, if a voltage is applied to the individual electrode 65, the piezoelectric ceramic layer 63a is deformed due to a piezoelectric effect. Therefore, when a predetermined driving signal is applied to the individual electrode 65, the piezoelectric ceramic layer 63b relatively fluctuates in such a way that the volume of the nozzle pressurizing chamber 59 is reduced, thereby ejecting the paint.

Figure 7:
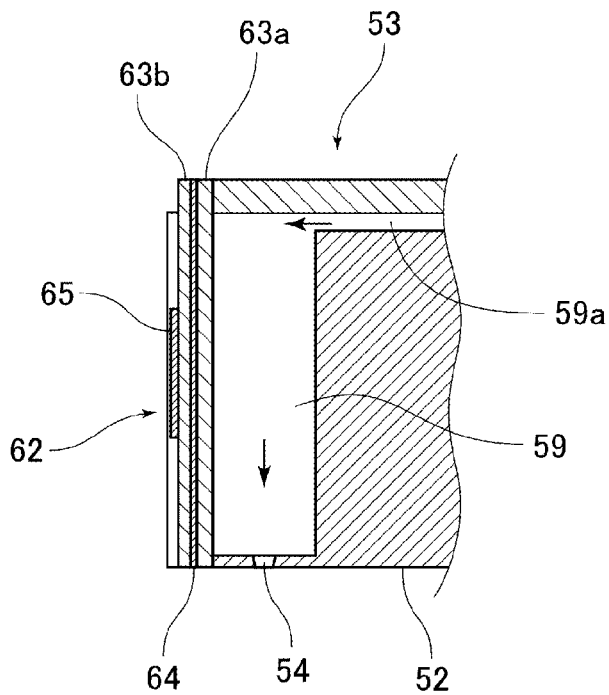
FIG. 7 is a cross-sectional view showing a deformation example of the structure in the vicinity of the column direction supply flow path, the nozzle pressurizing chamber and the column direction discharge flow path shown in FIG. 6.

In addition, in the structure shown in FIG. 6, the common electrode 64 is configured on the top surface of the nozzle pressurizing chamber 59, but it is not limited to this structure. For example, as shown in FIG. 7, a structure in which the common electrode 64 is configured on a side face of the nozzle pressurizing chamber 59 may also be used, and in addition, any structure may be used as long as the paint may be ejected from the nozzle 54 well.

1-4. A Control Structure of a Painting Machine for a Vehicle

Figure 8:
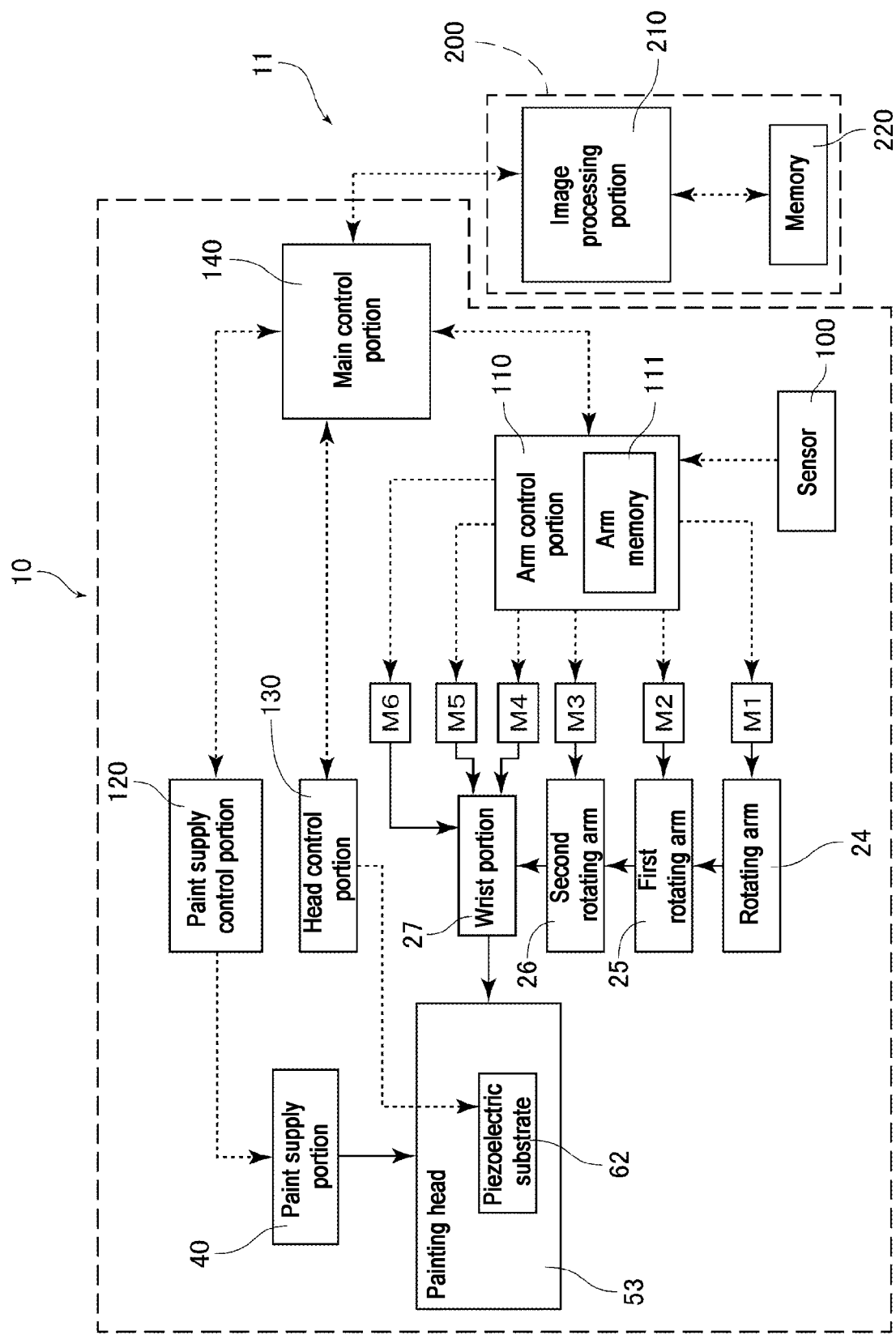
FIG. 8 is a diagram showing a control structure of the painting robot system shown in FIG. 1.

Next, the control structure of the painting robot system 11 of the present embodiment will be described. FIG. 8 is a diagram showing the control structure of the painting robot system 11. As shown in FIG. 8, the painting robot system 11 is provided with a sensor 100, an arm control portion 110, a paint supply control portion 120, a head control portion 130, a main control portion 140, and an image processing device 200. In addition, the image processing device 200 is provided with an image processing portion 210 and a memory 220.

In addition, the arm control portion 110, the paint supply control portion 120, the head control portion 130, the main control portion 140 and the image processing portion 210 are composed of a CPU (Central Processing Unit), a storage location (an ROM (Read Only Memory), an RAM (Random Access Memory), a non-volatile memory or the like), and other elements. In addition, the image processing portion 210 and the CPU with excellent image processing performance use a GPU (Graphics Processing Unit) together, or use a GPU instead of the CPU.

Examples of the sensor 100 in the above-mentioned control structure include an angular velocity sensor, an acceleration sensor, an image sensor, a ToF (Time of Flight) sensor or the like, but other sensors may also be used. The sensor 100, under the control of the arm control portion 110, may maintain the nozzle forming surface 52 of the painting head 53 in parallel with a painting surface. In addition, more preferably, the sensor 100 detects the action and position of the painting head 53. In addition, in FIG. 8, a detection signal of the sensor 100 is input to the arm control portion 110, but may also be input to at least one of the paint supply control portion 120, the head control portion 130 and the main control portion 140.

In addition, the arm control portion 110 is a portion that controls the driving of the above motors M1 to M6. The arm control portion 110 is provided with an arm memory 111, and the arm memory 111 stores data (trajectory data) related to the trajectory of the painting head 53 and created considering robot instruction of a painting width that the painting head 53 may paint, and posture data related to postures such as inclination of the painting head 53.

Moreover, the arm control portion 110 controls the driving of the motors M1 to M6 on the basis of the trajectory data and the posture data stored in the arm memory 111 and the image processing in an image processing portion 210 described later. By means of the control, the painting head 53 may pass through a desired position for performing painting at a desired speed, or stop at a predetermined position. In addition, the arm memory 111 may also be provided on the painting robot 10. However, the arm memory 111 may exist outside the painting robot 10, and information may be received and sent relative to the arm memory 111 by means of a wired or wireless communication mechanism.

In addition, the paint supply control portion 120 is a portion that controls the supply of the paint to the painting head 53, and specifically controls the operation of a pump, a valve and the like included in the paint supply unit 40. At this time, preferably, the paint supply control portion 120 controls the operation of the above pump and the valve by supplying the paint at a constant pressure (one example of the constant pressure is a fixed amount) relative to the painting head 53. In addition, the paint supply portion 40 is connected with, for example, a paint tank that stores the paint, a box that stores the paint, etc.

In addition, the head control portion 130 is a portion that controls the operation of the piezoelectric substrate 62 in the painting head unit 50 based on the image processing in the image processing device 200. When the head control portion 130 reaches a predetermined position of the trajectory data according to a mechanism that detects the position of the sensor 150 or the like described later, it controls the ejection of the paint based on divided painting data corresponding to the position. In addition, in this case, the driving frequency of the piezoelectric substrate 62 is controlled in a manner of ensuring a uniform film thickness of the vehicle, so as to control the number of points (the number of droplets) ejected from the nozzle 54, or the voltage applied to the piezoelectric substrate 62 is controlled to control the size of the droplets ejected from the nozzle 54.

In addition, the main control portion 140 is a portion that sends a predetermined control signal to the arm control portion 110, the paint supply control portion 120 and the head control portion 130 by performing painting on the painting object by means of the cooperation of the motors M1 to M6, the paint supply portion 40 and the piezoelectric substrate 62.

In addition, the image processing portion 210 creates a three-dimensional model (three-dimensional model for painting) based on CAD data corresponding to the painting range of the vehicle and measurement data of the actual vehicle. In addition, the image processing portion 210 forms two-dimensional image data corresponding to a painting path based on the trajectory data stored in the arm memory 111 and the three-dimensional model for painting, and the above-mentioned painting path corresponds to the painting of the painting head 53 along the trajectory data.

The image data corresponds to data which is divided by making a painting area of the vehicle correspond to the painting path. Moreover, the image data is provided with image data for a forward path for performing painting in the forward path during the reciprocating movement in the main scanning direction of the painting head and image data for a backward path for performing painting in the backward path during the reciprocating movement in the main scanning direction. In addition, the image data for the forward path and the image data for the backward path are formed in a state where first strip image data corresponding to the ejection of the droplets from the nozzle 54 in the first nozzle column 55A and second strip image data corresponding to the ejection of the droplets from the nozzle 54 in the second nozzle column 55B are alternately configured (details will be described later).

In addition, the memory 220 stores the image data created by the image processing portion 210 described above. Here, the image data for the forward path and the image data for the backward path are stored in the memory 220 in advance in a state corresponding to the sequence of the painting path. Therefore, when the painting head 53 executes the painting of each painting path based on a predetermined painting program, according to the sequence of the painting path, any one of the image data for the forward path and the image data for the backward path is read out, and based on the image data, the driving of the painting head 53 is controlled to perform the painting. Therefore, immediately in front of the painting path, it is not necessary to use a dedicated program, by means of the image processing portion 210, to create the image data for the forward path or the image data for the backward path corresponding to the painting path. Therefore, the stop of painting caused by the delay of image processing is prevented.

2. Regarding the Role

Next, based on FIG. 9, a painting method for painting objects such as vehicles and vehicle components in the painting robot 10 and the painting robot system 11 having the above-mentioned structure will be described. FIG. 9 is a flow diagram showing an outline of the painting method using the painting robot 10 and the painting robot system 11 of the present embodiment.

Step S11: creation of trajectory data

First, the trajectory data is created based on the three-dimensional CAD data of the vehicle that has been created, and the three-dimensional measurement data in which the actual shape of the vehicle is measured. The trajectory data may be created considering robot instruction of a painting width that the painting head 53 may paint, and the trajectory data may be created automatically based on the CAD data. In addition, the trajectory data is a trajectory of the painting head 53 moving relative to the vehicle within a predetermined height range.

Step S12: creation of posture data

Next, the arm control portion 110 creates the posture data in a manner corresponding to the above-mentioned trajectory data. In addition, the posture data may also be created together with the above-mentioned trajectory data. The posture data is created such that the long side direction (the lateral width direction) of the painting head 53 is maintained perpendicular relative to the main scanning direction M (the travelling direction) of the painting head 53. By creating such posture data, it is possible to eject the paint on the painting surface at equal intervals in the long side direction (the lateral width direction) of the painting head 53.

Here, FIG. 10 shows an image when the long side direction of the painting head 53 is not maintained perpendicular relative to the main scanning direction M of the painting head 53 (when the long side direction is inclined relative to the main scanning direction M. As shown in FIG. 10, if the long side direction of the painting head 53 is inclined, the landing positions of the droplets will be in a non-uniform state. That is, a portion where the droplets overlap each other and a portion where the droplets do not overlap and leave gaps are formed. Such overlaps and gaps of the droplets may cause poor painting. Therefore, the posture data is created such that the long side direction of the painting head 53 is maintained perpendicular relative to the main scanning direction M of the painting head 53.

In addition, the posture data is created so that in a section (cross section) in the width direction of the vehicle, at least a portion of the nozzle forming surface 52 of the painting head 53 maintains a state of being parallel to the cross section of the vehicle that serves as the painting target. For example, the posture data is created, such that in the case where the portion of the painting width is inclined at a predetermined angle θ1 relative to the horizontal plane like the end side in the width direction of the vehicle, the painting head 53 is also inclined by the inclination amount.

In addition, for the posture data, preferably, the posture data is created such that, for example, when the inclination angle of the painting surface at the position opposed to the center of the long side direction of the nozzle forming surface 52 is inclined at the above-mentioned angle θ1, the long side direction of the painting head 53 is also inclined at the angle θ1. In this way, with the center of the nozzle forming surface 52 in the long side direction as a reference, the painting head 53 is inclined at the same angle as the inclination angle θ1 of the portion opposed to the center, so that the distance between any side of one end side or the other end side of the painting width of the nozzle forming surface 52 and the painting surface is prevented from becoming larger. This is also because the distance between the center of the nozzle forming surface 52 in the long side direction and the painting surface opposed to the center is often the smallest, and the portion (the portion on a vehicle side) opposed to the center of the long side direction becomes a reference position.

However, it is also possible to set the posture data in the following manner to incline the painting head 53, so that, for example, when a height difference used as the reference portion is located close to one end side, the nozzle head 53 moves away from the other end side of a root position of the height difference and gradually approaches to the painting surface.

In addition, like the both end sides of the painting head 53 in the main scanning direction M, in the section (longitudinal cross section) along the main scanning direction M, the painting surface may be inclined relative to the horizontal plane sometimes. In this case, preferably, the posture data is created so that when the portion opposed to the center of the nozzle forming surface 52 in a short side direction (longitudinal width direction; in this case, it is consistent with the main scanning direction M) is inclined at an angle θ2, the short side direction of the painting head 53 is also inclined at the angle θ2. However, it is not necessary to create the posture data in such a way that the short side direction is inclined at the angle θ2. At this time, in order to ensure the uniformity of the film thickness, the density of the image data may be increased in accordance with the size of the angle θ2.

Step S13: creation and storage of the image data for the forward path (corresponding to the first image data creation step and the storage step)

Next, based on the three-dimensional CAD data of the vehicle or the three-dimensional measurement data in which the actual shape of the vehicle is measured, the trajectory data and the posture data, the image processing portion 210 creates the image data for the forward path for the painting head 53 to perform painting on the forward path (forward direction) on the reciprocating path along the main scanning direction M. Furthermore, the created image data for the forward path is correlated and stored in the memory 220 according to the painting sequence of the painting path.

In addition, in the vehicle, only the paint of the same color type is ejected from the painting head 53 in most cases. However, it is possible to perform the painting, for example, in a combination of two colors, and it is also possible to perform the painting by means of other various appearance designs.

FIG. 11 shows a landing image of droplets of the paint related to the image data for the forward path. In addition, in order to simplify the description, FIG. 11 shows a case where there are two nozzles 54A in the first nozzle column 55A, and there are two nozzles 54B in the second nozzle column 55B. In addition, in FIG. 11, the case where the painting head 53 travels on the forward path (the forward direction) in the main scanning direction M is shown from left to right, but the landing state of the paint ejected from the nozzle 54 is shown on the rightmost side.

In addition, the ejection sequence of the droplets from the respective nozzles 54 is indicated by numbers in the top left corner of FIG. 11. If No. 1 and No. 2 are assigned starting from the nozzle 54 located on a front side in the main scanning direction M, then in FIG. 11, No. 1 corresponds to the nozzle 54A1 on the front side of the first nozzle column 55A, and No. 2 corresponds to the nozzle 54A2 on a rear side of the first nozzle column 55A, No. 3 corresponds to the nozzle 54B1 on the front side of the second nozzle column 55B, and No. 4 corresponds to the nozzle 54B2 on the rear side of the second nozzle column 55B.

In addition, in FIG. 11, the pitch (main scanning pitch) between the nozzles 54 in the main scanning direction M (between the nozzles 54A, between the nozzles 54B, and between the nozzles 54A and 54B) is set as L1. Furthermore, in FIG. 11, a case is considered where the droplets are ejected to a painting production line CL at an arbitrary position in the secondary scanning direction S that is orthogonal to the main scanning direction M. In addition, in FIG. 11, in order to simplify the description, it is assumed that two droplets land between the main scanning pitch L1, but the number of droplets that land between the main scanning pitch L1 may be set as an arbitrary number.

As shown in FIG. 11, when the painting head 53 is traveling in the main scanning direction M, the droplets are firstly ejected from the nozzle 54A1 on an upstream side in the first nozzle column 55A toward the painting production line CL, and thereafter, the droplets are ejected from the nozzle 54A2 in the first nozzle column 55A toward the painting production line CL. After the ejection is completed, the droplets are ejected from the nozzle 54B1 in the second nozzle column 55B toward the painting production line CL, and then, the droplets are ejected from the nozzle 54B2 in the second nozzle column 55B toward the painting production line CL.

In addition, as shown in FIG. 11, the landing positions of the droplets ejected from the nozzle 54B2 in the second nozzle column 55B are positions between the landing positions of the droplets from the nozzle 54A1 and the nozzle 54A2 on the painting production line CL.

Such an ejection sequence is the same even when the number of the nozzles 54 in each nozzle column 55 changes. For example, when there are 8 nozzles 54A in the first nozzle column 55A and 8 nozzles 54B in the second nozzle column 55B, the nozzles 54 from No. 1 to No. 8 in the ejection sequence respectively correspond to the first to eighth nozzles 54A in front of the first nozzle column 55A. In addition, the ninth to sixteenth nozzles 54 in the ejection sequence respectively correspond to the first to eighth nozzles 54B in the front of the second nozzle column 55B.

Here, if the speed of the painting head 53 is set as V1, it takes L1/V1 from the time when the nozzle 54A1 ejects the droplets to the time when the nozzle 54A2 ejects the droplets. That is, at the main scanning pitch L1, the adjacent nozzles 54 eject the droplets at a time difference of L1/V1.

In addition, FIG. 12 shows the image data (the image data for the forward path) in the case shown in FIG. 11. In addition, for the image data for the forward path shown in FIG. 12, the overall shape is a strip shape that is longer in the main scanning direction M than in the secondary scanning direction S. However, in FIG. 12, a portion of the entirety is taken out, so the actual image data for the forward path is more continuous than the content shown in FIG. 12 in the main scanning direction M and the secondary scanning direction S. In addition, the image data for the forward path becomes a state of having first strip image data of a strip shape corresponding to nozzles 54A in the first nozzle column 55A and a second strip image data of a strip shape corresponding to nozzles 54B in the second nozzle column 55B. However, the positions of the termination ends of the first strip image data and the second strip image data are consistent, and therefore, the image data for the forward path becomes a strip shape.

As shown in FIG. 12, the image data for the forward path is configured such that pixels (points) become strip. Based on such image data for the forward path, the head control portion 130 controls the driving of the piezoelectric substrate 62 of each nozzle 54 in consideration of the delay of the arrival time of each nozzle 54 to the arbitrary painting production line CL. For example, in FIG. 11, the driving moment of the piezoelectric substrate 62 is controlled by the head control portion 130, so that after the droplets are ejected from the No. 1 nozzle 54A1, at the No. N nozzle 54, the droplets are ejected from the nozzle 54 with a delay of (L1/V1)×N.

Step S14: creation and storage of the image data for the backward path (corresponding to the second image data creation step and the storage step)

Next, based on the three-dimensional CAD data of the vehicle or the three-dimensional measurement data in which the actual shape of the vehicle is measured, the trajectory data and the posture data, the image processing portion 210 creates the image data for the backward path for the painting head 53 to perform painting on the backward path on the reciprocating path along the main scanning direction M.

Furthermore, the created image data for the backward path is correlated and stored in the memory 220 according to the painting sequence of the painting path.

In the present embodiment, the head control portion 130 does not perform unique control for the painting of the backward path. In addition, in the image processing portion 210, no special image data for the backward path is created during the painting on the backward path or after the painting on the backward path is completed (that is, immediately in front of the painting path of the backward path). However, in the present embodiment, no special control is performed for the painting of the backward path, and the image data for the backward path is created in advance in a stage before the painting of the forward path and the backward path is executed.

That is, in the present embodiment, the head control portion 130 does not need to specifically recognize the backward path, and controls the piezoelectric substrate 62 in the same way as the forward path. However, for this reason, the image processing portion 210 creates the image data that is impossible in that way in the forward path as the image data for the backward path. Hereinafter, the outline of such image data for the backward path will be described.

FIG. 13 is a diagram showing a situation of the landing positions of the droplets when the droplets are ejected from the nozzles 54 in the same sequence as that of FIG. 11 on the backward path of the painting head 53 that performs a reciprocating action. In addition, in FIG. 13, the case where the painting head 53 travels on the backward path (backward direction) in the main scanning direction M is shown from left to right, but the landing state of the paint ejected from the nozzle 54 is shown on the rightmost side.

As shown in FIG. 13, when the painting head 53 travels on the backward path (backward direction) in the main scanning direction M, as in FIG. 11, in the case where the droplets are ejected in a sequence of the nozzle 54A1, the nozzle 54A2, the nozzle 54B1 and the nozzle 54B2, the landing positions of the droplets are not consistent on the arbitrary painting production line CL, but greatly deviate. Specifically, between the adjacent nozzles 54 (for example, between the nozzle 54A1 and the nozzle 54A2) in the main scanning direction M, the landing positions of the droplets deviate by a distance twice the main scanning pitch L1.

On such a backward path of the painting head 53 that performs the reciprocating action, an image without deviation of the landing positions of the droplets on the arbitrary painting production line CL (including a starting end position and a termination end position on the painting path of the backward path) is shown in FIG. 14. In FIG. 14, the ejection sequence of the droplets from the nozzle 54 is shown on the top left corner. In addition, the landing state of the paint ejected from the nozzle 54 is shown on the right side of FIG. 14. As shown in FIG. 14, in order to prevent the deviation of the landing positions of the droplets on the arbitrary painting production line CL, No. 1 corresponds to the nozzle 54B2 in the second nozzle column 55B, No. 2 corresponds to the nozzle 54B1 in the second nozzle column 55B, No. 3 corresponds to the nozzle 54A2 in the first nozzle column 55A, and No. 4 corresponds to the nozzle 54A1 in the first nozzle column 55A. That is, if FIG. 11 is compared with FIG. 14, the ejection sequence of the droplets from the nozzle 54 is reversed.

Here, in the painting robot 10, the arm control portion 110 causes the robot arm R1 to control the driving, such that the painting head 53 may move on the forward path (the forward direction) or the backward path (the backward direction) path in the main scanning direction M, and the forward path (the forward direction) and the backward path (the backward direction) path may be distinguished. However, in order to simplify the control, it is not necessary to distinguish whether the movement of the painting head 53 is on the forward path (the forward direction) or the backward path (the backward direction) path in the main scanning direction M in the head control portion 130. For example, it may be regarded that the entire painting head 53 moves on the forward path (the forward direction) in the main scanning direction M for processing.

From this point of view, FIG. 15 shows a state where the ejection sequence of the droplets from the nozzles 54 without deviation of the landing positions of the droplets on the arbitrary painting production line CL shown in FIG. 14 is replaced with the movement of the painting head 53 on the forward path (the forward direction) in the main scanning direction M. In this case, the ejection sequence of the droplets from the nozzle 54 is the same as the state shown in FIG. 14, No. 1 corresponds to the nozzle 54B2 in the second nozzle column 55B, No. 2 corresponds to the nozzle 54B1 in the second nozzle column 55B. No. 3 corresponds to the nozzle 54A2 in the first nozzle column 55A, and No. 4 corresponds to the nozzle 54A1 in the first nozzle column 55AB.

Therefore, as shown in FIG. 15, if the painting head 53 moves in the forward direction, the landing positions of the droplets in appearance will be in a non-uniform state on the arbitrary painting production line CL. Specifically, in view of the landing positions of the droplets ejected from a certain nozzle 54 and the landing positions of the droplets ejected from the next nozzle 54 in the ejection sequence, the droplets are ejected in a manner of deviating by twice of the main scanning pitch L1.

Here, the image data (the image data for the backward path) in the case shown in FIG. 15 is shown in FIG. 16. In addition, for the image data for the backward path shown in FIG. 16, the overall shape is a strip shape that is longer in the main scanning direction M than in the secondary scanning direction S. In FIG. 16, a portion of the entirety is taken out, therefore, the actual image data for the forward path is more continuous than the content shown in FIG. 16 in the main scanning direction M and the secondary scanning direction S.

As shown in FIG. 16, for the image data for the forward path, pixels (points) are configured corresponding to the deviation of the landing positions of the droplets as shown in FIG. 15. That is, for the image data for the forward path, as shown in FIG. 16, the first strip image data of the strip shape corresponding to nozzles 54A in the first nozzle column 55A and the second strip image data of the strip shape corresponding to nozzles 54B in the second nozzle column 55B become a state in which the termination end positions are inconsistent and thus generate position deviation.

At this time, relative to the landing positions of the droplets ejected from a certain nozzle 54 and the landing positions of the droplets ejected from the next nozzle 54 in the ejection sequence, the pixels (points) are configured in a manner of deviating by twice of the main scanning pitch L1. Here, if the number of the nozzles 54 in each nozzle column 55 is set as N, for example, a termination end portion in the main scanning direction M of the pixel corresponding to the nozzle 54A1 and the termination end portion in the main scanning direction M of the pixel corresponding to the nozzle 54B1 are configured with pixels (points) in a manner of generating the position deviation in the following manner (formula 1).

$$\text{The number of pixels (points) of the position deviation} = L1 \times N \times 2 \quad \text{(formula 1)}$$

In addition, in FIG. 16, the main scanning pitch L1 is configured with two points, and therefore, the position deviation is generated with 8 pixels (points). In addition, in FIG. 16, the main scanning pitch L1 is configured with two pixels (points), but it is also possible to configure any number of pixels (points) between the main scanning pitch L1 corresponding to the number of landings of the droplets. In addition, in the above example, the amount of position deviation between the first nozzle 54A1 in the first nozzle column 55A and the first nozzle 54B1 in the second nozzle column 55B with adjacent landing positions is figured out, but for the amount of position deviation between the Pth nozzle 54A in the first nozzle column 55A and the Pth nozzle 54B in the second nozzle column 55B with adjacent landing positions may also be figured out by the above-mentioned (formula 1).

In addition, in the above description, the case where there are two nozzles 54A in the first nozzle column 55A and two nozzles 54B in the second nozzle column 55B is described. However, the number of nozzles 54 in the first nozzle column 55A and the second nozzle column 55B is not limited to two. As an example, in the case where the number of nozzles 54 in the first nozzle column 55A and the second nozzle column 55B is 4, the image data for the backward path is shown in FIG. 17A, and the image data in the case of 8 is shown in FIG. 17B.

In FIG. 17A, the number of nozzles 54 in the nozzle column 55 is 4, therefore, according to (formula 1), for example, the termination end portion in the main scanning direction M of the pixel corresponding to the nozzle 54A1 and the termination end portion in the main scanning direction M of the pixel corresponding to the nozzle 54B1 generate the position deviation by 16 pixels (points). In addition, in FIG. 17B, the number of nozzles 54 in the nozzle column 55 is 8, therefore, according to (formula 1), for example, the termination end portion in the main scanning direction M of the pixel corresponding to the nozzle 54A1 and the termination end portion in the main scanning direction M of the pixel corresponding to the nozzle 54B1 generate the position deviation by 32 pixels (points).

Here, if the painting length on the painting path is the same on the forward path (the forward direction) and the backward path (backward direction) in the main scanning direction M, the total number of pixels (the total number of points) is the same. Therefore, for example, as shown in FIG. 18, if the painting production line CL at the termination end position is a turn line, it is also possible to form the image data for the backward path from the image data for the forward path.

In addition, in step S13, the creation and storage of the image data for the backward path may also be performed. At this time, in step S14, the creation and storage of the image data for the forward path are executed. In addition, at this time, in step S15 that will be described below, the painting of the backward path is executed (at this time, step S15 corresponds to the backward path painting execution step), and in step S17, the painting of the forward path is executed (at this time, step S17 corresponds to the forward path painting execution step).

Step S15: execution of the painting of the forward path (corresponding to the forward path painting execution step)

Based on the image data for the forward path created as described above, painting is performed on the vehicle. In this case, the arm control portion 110 causes the painting head 53 to move toward the forward direction of the main scanning direction M on the basis of an instruction of the main control portion 140. In addition, the head control portion 130 reads out the image data for the forward path stored in the memory 220 on the basis of the instruction of the main control portion 140. The head control portion 130 controls the operation of the piezoelectric substrate 62 on the basis of the image data for the forward path, and performs painting on the forward path of the vehicle.

In addition, in this painting, the arm control portion 110 controls the robot arm R1 so that the long side direction of the painting head 53 is orthogonal to the main scanning direction M (it is the same in step S17).

Step S16: determining whether the painting operation is completed

After the painting of the forward path in step S15 is completed, it is determined whether the painting operation is completed. In this determination, if it is determined that the painting operation is finished (in the case of yes), the painting operation is finished. On the other hand, in this determination, if it is determined that the painting operation is not finished (in the case of no), the process proceeds to the next step S17.

Step S17: execution of the painting of the backward path (corresponding to the backward path painting execution step)

Based on the image data for the backward path created as described above, painting is performed on the vehicle. In this case, the arm control portion 110 causes the painting head 53 to move toward the backward direction of the main scanning direction M based on the instruction of the main control portion 140. In addition, the head control portion 130 reads out the image data for the backward path stored in the memory 220 based on the instruction of the main control portion 140. The head control portion 130 controls the operation of the piezoelectric substrate 62 based on the image data for the backward path, so as to perform the painting of the backward path on the vehicle.

Step S18: determining whether the painting operation is completed

After the painting of the backward path in step S17 is completed, it is determined whether the painting operation is completed. In this determination, if it is determined that the painting operation is finished (in the case of yes), the painting operation is finished. On the other hand, in this determination, if it is determined that the painting operation is not finished (in the case of no), the process returns to the above step S15.

As described above, the painting is performed on the vehicle.

3. Regarding the Effect

In the painting robot system 11 having the above-mentioned structure, the painting robot 10 is provided with: a painting head 53, which is provided with a plurality of nozzles 54 for ejecting droplets and a piezoelectric substrate 62 for driving the nozzles 54 to eject the droplets; a robot arm R1, which is provided with the painting head 53 at a front end and causes the painting head 53 to move toward a desired position; an arm control portion 110, which controls the driving of the robot arm R1; and a head control portion 130, which is arranged inside the painting head 53 and controls the operation of the piezoelectric substrate 62.

In addition, the painting head 53 is provided with: a nozzle column 55 provided with a plurality of nozzles 54, the nozzle column 55 is arranged obliquely relative to a long side direction of the painting head 53, and the nozzle column 53 is provided with a first nozzle column 55A located on one side in a main scanning direction M of the painting head 53 and a second nozzle column 55B located on the other side in the main scanning direction M. In addition, the first nozzle column 55A and the second nozzle column 55B are configured in a state where the droplets ejected from the nozzles 54B in the second nozzle column 55B when the long side direction of the painting head 53 is orthogonal to the main scanning direction M are ejected in the middle of the droplets ejected from adjacent nozzles 54A in the first nozzle column 55A. In addition, the image processing device 200 is provided with: an image processing portion 210, which creates image data of each path for performing painting, that is, each painting path, of the painting head 53; and a memory 220, which stores the image data of each painting path corresponding to a painting sequence.

In addition, the image data is provided with: image data for a forward path for performing painting on the forward path of reciprocating movement in the main scanning direction M of the painting head 53, and image data for a backward path for performing painting on the backward path of the reciprocating movement. Furthermore, the distance between adjacent nozzles in each nozzle column is set as L1, the droplets are ejected from the nozzles 54A in the first nozzle column 55A earlier than the nozzles 54B in the second nozzle column 55B on the forward path, and the number of nozzles 54 in the first nozzle column 55A or the second nozzle column 55B is set as N. At this time, the image processing portion 210 creates the image data for the forward path in a state of having first strip image data of a strip shape corresponding to nozzles 54A in the first nozzle column 55A and second strip image data of a strip shape corresponding to nozzles 54B in the second nozzle column 55B. In addition, the image processing portion 210 creates the second strip image data as the image data for the backward path in a state of deviating with relative to the first strip image data, the amount of position deviation is set as the following position: the Pth nozzle 54B in the second nozzle column 55B lands first relative to the Pth nozzle 54A in the first nozzle column 55A with an adjacent landing position at a distance of multiplying the number N by twice of the distance L1. In addition, the head control portion 130 reads the image data for the forward path from the memory 220 on the forward path of the painting head 53 and controls the operation of the piezoelectric substrate on the basis of the image data for the forward path, and reads the image data for the backward path from the memory 220 on the backward path of the painting head 53 and controls the operation of the piezoelectric substrate 62 on the basis of the image data for the backward path.

In this way, when the nozzle column 55 is inclined relative to the long side direction of the painting head 53, if the painting of the backward path is performed based on the image data for the forward path, the position of a painting location will be deviated. However, as described above, the image processing portion 210 creates the image data for the forward path as described above and performs the painting based on the image data for the forward path, so that it is possible to prevent the position deviation of the landing positions of the droplets of the paint. Therefore, high-quality painting may also be performed on the backward path, therefore painting may be performed on both sides of the reciprocation, and accordingly, the productivity of painting may be improved.

In addition, if the image data for the forward path (backward direction) is created by a dedicated program based on the image data for the forward path, problems such as a stop time of the painting robot until the completion of the creation will occur. However, by storing the image data for the forward path and the image data for the backward path in the memory 220 in correspondence with the painting sequence, it is possible to prevent the occurrence of such a stop time.

In addition, in the present embodiment, the arm control portion 110 or the image processing portion 210 forms a trajectory of the painting head moving relative to the vehicle within a predetermined height range, that is, trajectory data, and the image data is formed along the trajectory data.

In this way, by creating the image data (the image data for the forward path and the image data for the backward path) along the trajectory data, it is possible to create the image data in a state reflecting the actual height of the vehicle. Therefore, it is possible to realize high-quality painting with high smoothness without uneven painting on the surface of the painting location.

In addition, in the present embodiment, the arm control portion 110 controls the robot arm R1, so that the long side direction of the painting head 53 is orthogonal to the main scanning direction M.

In this way, the operation of the robot arm R1 is controlled so that the long side direction of the painting head 53 is maintained orthogonal to the main scanning direction M, in this way, the interval between adjacent droplets may be maintained in a balanced manner, and the formation of the portion where the droplets overlap each other and the portion where the droplets do not overlap and leave gaps as shown in FIG. 10 may be prevented. Therefore, it is possible to prevent the formation of gaps or the thinning of the painting film due to the expansion of the interval between adjacent droplets, or, conversely, the case where the painting film becomes thick due to the excessive overlap of the adjacent droplets, and thus the painting quality may be improved.

In addition, in the above invention, when the image processing portion creates the image data in the same path, the image data for the forward path and the image data for the backward path are formed to have the same number of points.

Therefore, the image data is created so that in the case of painting paths (paths) having the same length, the number of pixels (the number of points) in the image data for the forward path and the image data for the backward path does not change during the reciprocation, therefore the film thickness of the painting film may be maintained consistently, and the painting quality may be improved.

4. Regarding a Modification Example

One embodiment of the present invention has been described above, but the present invention may have various modifications in addition to the above-mentioned embodiment.

Hereinafter, a modification example will be described.

In the above-mentioned embodiment, the case where there are two (two layers of) nozzle columns 55 in the main scanning direction M has been described. However, the nozzle columns 55 are not limited to two layers, and three or more layers may also be provided, or only one layer may be provided.

In addition, when there are three or more layers of nozzle columns 55, the amount of position deviation between the Pth nozzle 54A in the first nozzle column 55A and the Pth nozzle 54B in the second nozzle column 55B, and the amount of position deviation between the Pth nozzle 54B in the second nozzle column 55B and the Pth nozzle 54 in the third nozzle column may also be figured out by the above (formula 1), but may also be figured out by using other formulas.

In addition, in the above-described embodiment, the memory 220 is arranged in the image processing device 200, but it may also be arranged at a location other than the image processing device 200. For example, the memory 220 may be arranged at a predetermined position inside the painting robot 10.

DESCRIPTION OF REFERENCE SIGNS

10 . . . painting robot; 11 . . . painting robot system; 20 . . . robot main body; 21 . . . base; 22 . . . leg portion; 23 . . . rotating shaft portion; 24 . . . rotating arm; 25 . . . first rotating arm; 26 . . . second rotating arm; 27 . . . wrist portion; 30 . . . chuck portion; 40 . . . paint supply portion; 50 . . . painting head unit; 52 . . . nozzle forming surface; 53 . . . painting head; 54, 54A, 54A1, 54A2, 54A11 to 54A13, 54B, 54B1, 54B2, 54B11 to 54B13 . . . nozzles; 55 . . . nozzle column; 55A . . . first nozzle column; 55B . . . second nozzle column; 57 . . . supply side large flow path; 58 . . . column direction supply flow path; 59 . . . nozzle pressurizing chamber; 59a . . . nozzle supply flow path; 59b . . . nozzle discharge flow path; 60 . . . column direction discharge flow path; 61 . . . discharge side large flow path; 62 . . . piezoelectric substrate; 63a . . . piezoelectric ceramic layer; 63b . . . piezoelectric ceramic layer; 64 . . . common electrode; 65 . . . individual electrode; 71 . . . supply path; 72 . . . return path; 100 . . . sensor; 110 . . . arm control portion; 111 . . . arm memory; 120 . . . paint supply control portion; 130 . . . head control portion; 140 . . . main control portion; 150 . . . sensor; 200 . . . image processing device; 210 . . . image processing portion; 220 . . . memory; CL . . . painting production line; L1 . . . main scanning pitch; M . . . main scanning direction; M1 to M6 . . . motors; PL . . . projection straight line; R1 . . . robot arm; S . . . secondary scanning direction

What is claimed is:

1. A painting robot system, comprising: a painting robot for painting a vehicle, and an image processing device creating image data for painting the vehicle that is painted by the painting robot, the painting robot system comprising:
a painting head being provided with a first plurality of nozzles for ejecting droplets and a piezoelectric substrate for driving the first plurality of nozzles to eject the droplets;
a robot arm being provided with the painting head at a front end and causes the painting head to move toward a desired position;
an arm control portion controlling a driving of the robot arm; and
a head control portion being arranged inside the painting head and controlling an operation of the piezoelectric substrate,
wherein the painting head comprises a first nozzle column provided with a second plurality of nozzles of the first plurality of nozzles, and a second nozzle column provided with a third plurality of nozzles of the first plurality of nozzles, the first nozzle column and the second nozzle column being arranged obliquely relative to a long side direction of the painting head,
wherein the first nozzle column is located on one side in a main scanning direction of the painting head and the second nozzle column is located on the other side in the main scanning direction of the painting head and has the same number of nozzles as the first nozzle column,
wherein the first nozzle column and the second nozzle column are configured in a state where the droplets ejected from the third plurality of nozzles in the second nozzle column are ejected in the middle of the droplets ejected from adjacent nozzles of the second plurality of nozzles in the first nozzle column when the long side direction of the painting head is orthogonal to the main scanning direction,
wherein the image processing device comprises an image processing portion creating image data of each painting path, the painting path being a path for the painting head to perform painting; and a memory storing the image data of each painting path corresponding to a painting sequence, and
wherein the image data comprises image data for a forward path for performing painting on the forward path of reciprocating movement in the main scanning direction of the painting head, and image data for a backward path for performing painting on the backward path of the reciprocating movement,
wherein, when a distance between the adjacent nozzles in the first nozzle column and the second nozzle column are set as L1, the droplets are ejected from the second plurality of nozzles in the first nozzle column earlier than the third plurality of nozzles in the second nozzle column on the forward path, and the number of nozzles in the first nozzle column or the second nozzle column is set as N,
wherein the image processing portion creates the image data for the forward path in a state of having a first strip image data of a strip shape corresponding to the second plurality of nozzles in the first nozzle column and a second strip image data of a strip shape corresponding to third plurality of nozzles in the second nozzle column,
wherein the image processing portion creates the second strip image data as the image data for the backward path in a state of deviating relative to the first strip image data,
wherein an amount of position deviation is set such that the Pth nozzle in the second nozzle column lands first relative to the Pth nozzle in the first nozzle column with an adjacent landing position at a distance of multiplying the number N by twice of the distance L1, and
wherein the head control portion reads the image data for the forward path from the memory on the forward path of the painting head and controls the operation of the piezoelectric substrate on the basis of the image data for the forward path, and reads the image data for the backward path from the memory on the backward path of the painting head and controls the operation of the piezoelectric substrate on the basis of the image data for the backward path.

2. The painting robot system of claim 1, wherein the arm control portion or the image processing portion forms trajectory data that is a trajectory of the painting head moving relative to the vehicle within a predetermined height range, and wherein the image data is formed along the trajectory data.

3. The painting robot system of claim 1, wherein the arm control portion controls the robot arm, such that the long side direction of the painting head is orthogonal to the main scanning direction.

4. The painting robot system of claim 1, wherein, in a case that the image processing portion creates the image data in the same path, the image data for the forward path and the image data for the backward path are formed to have the same number of points.

5. A painting method, in which image data for painting a vehicle that is painted by a painting robot for painting the vehicle is created by an image processing device, and painting is performed, wherein the painting robot comprises:

a painting head comprising a first plurality of nozzles for ejecting droplets and a piezoelectric substrate for driving the first plurality of nozzles to eject the droplets;

a robot arm comprising the painting head at a front end and causes the painting head to move toward a desired position;

an arm control portion controlling a driving of the robot arm; and a head control portion being arranged inside the painting head and controls controlling an operation of the piezoelectric substrate, wherein the painting head comprises a first nozzle column provided with a second plurality of nozzles, a second nozzle column provided with a third plurality of nozzles, the first nozzle column and the second nozzle column being arranged obliquely relative to a long side direction of the painting head, wherein the first nozzle column is located on one side in a main scanning direction of the painting head and the second nozzle column is located on the other side in the main scanning direction of the painting head, wherein the first nozzle column and the second nozzle column are configured in a state where the droplets ejected from the third plurality of nozzles in the second nozzle column are ejected in the middle of the droplets ejected from adjacent nozzles of the second plurality of nozzles in the first nozzle column when the long side direction of the painting head is orthogonal to the main scanning direction, wherein the image processing device is provided with: an image processing portion creating image data of each painting path, the painting path being a path for the painting head to perform painting; and a memory storing the image data of each painting path corresponding to a painting sequence, and wherein the painting method comprises:

a first image data creation step comprising: when a distance between the adjacent nozzles in the nozzle columns is set as L1, the droplets are ejected from the second plurality of nozzles in the first nozzle column earlier than the third plurality of nozzles in the second nozzle column on a forward path, and when the number of nozzles in the first nozzle column or the second nozzle column is set as N, creating, by the image processing portion, image data for the forward path in a state of having a first strip image data of a strip shape corresponding to the second plurality of nozzles in the first nozzle column and a second strip image data of a strip shape corresponding to the third plurality of nozzles in the second nozzle column;

a second image data creation step comprising: creating, by the image processing portion, the second strip image data as image data for a backward path in a state of deviating relative to the first strip image data, and an amount of position deviation being set such that the Pth nozzle in the second nozzle column lands first relative to the Pth nozzle in the first nozzle column with an adjacent landing position at a distance of multiplying the number N by twice of the distance L1;

a storage step comprising: storing the image data for the forward path and the image data for the backward path in the memory corresponding to a painting sequence;

a forward path painting execution step comprising: reading the image data for the forward path from the memory on the forward path of the painting head, and controlling, by the head control portion, the operation of the piezoelectric substrate on the basis of the image data for the forward path, so as to perform painting on the vehicle; and a backward path painting execution step comprising: before or after the forward path painting execution step, reading the image data for the backward path from the memory on the backward path of the painting head, and controlling, by the head control portion, the operation of the piezoelectric substrate on the basis of the image data for the backward path, so as to perform the painting on the vehicle.

6. The painting robot system of claim 2, wherein the arm control portion controls the robot arm, such that the long side direction of the painting head is orthogonal to the main scanning direction.

7. The painting robot system of claim 2, wherein, in a case that the image processing portion creates the image data in the same path, the image data for the forward path and the image data for the backward path are formed to have the same number of points.

8. The painting robot system of claim 3, wherein, in a case that the image processing portion creates the image data in the same path, the image data for the forward path and the image data for the backward path are formed to have the same number of points.

* * * * *